US011853077B1

(12) United States Patent
Glas

(10) Patent No.: US 11,853,077 B1
(45) Date of Patent: Dec. 26, 2023

(54) SYSTEM FOR DETERMINING CONSTRAINT REGIONS FOR AN AUTONOMOUS MOBILE DEVICE

(71) Applicant: AMAZON TECHNOLOGIES, INC., Seattle, WA (US)

(72) Inventor: Dylan Fairchild Glas, San Francisco, CA (US)

(73) Assignee: AMAZON TECHNOLOGIES, INC., Seattle, WA (US)

( * ) Notice: Subject to any disclaimer, the term of this patent is extended or adjusted under 35 U.S.C. 154(b) by 430 days.

(21) Appl. No.: 16/929,459

(22) Filed: Jul. 15, 2020

(51) Int. Cl.
*G05D 1/02* (2020.01)
*G05D 1/00* (2006.01)
*G06T 5/00* (2006.01)

(52) U.S. Cl.
CPC ......... *G05D 1/0274* (2013.01); *G05D 1/0088* (2013.01); *G05D 1/0223* (2013.01); *G05D 1/0238* (2013.01); *G06T 5/002* (2013.01)

(58) Field of Classification Search
CPC .. G05D 1/0274; G05D 1/0088; G05D 1/0223; G05D 1/0238; G06T 5/002; G06T 7/155; G06T 2207/20036; G06V 10/34; G06V 30/18
See application file for complete search history.

(56) References Cited

U.S. PATENT DOCUMENTS

| 2013/0100286 A1* | 4/2013 | Lao | G06V 20/54 |
| | | | 348/148 |
| 2016/0375901 A1* | 12/2016 | Di Cairano | G01C 21/34 |
| | | | 701/26 |
| 2018/0162408 A1* | 6/2018 | Stein | B60G 17/0165 |
| 2020/0088539 A1* | 3/2020 | Shashua | G01C 21/3889 |

OTHER PUBLICATIONS

E. Masehian, M. R. Amin-Naseri and S. E. Khadem, "Online motion planning using incremental construction of medial axis," 2003 IEEE International Conference on Robotics and Automation (Cat. No. 03CH37422), Taipei, Taiwan, 2003, pp. 2928-2933 vol.3, doi: 10.1109/ROBOT.2003.1242040. (Year: 2003).*
"Distance Transform", HIPR2, 5 pages. Retrieved from the Internet: URL: https://homepages.inf.ed.ac.uk/rbf/HIPR2/distance.htm.

(Continued)

*Primary Examiner* — Kenneth J Malkowski
*Assistant Examiner* — Ibrahim Abdoalatif Alsomairy
(74) *Attorney, Agent, or Firm* — Lindauer Law, PLLC

(57) ABSTRACT

A system uses an obstacle map to determine an avoidance map that indicates one or more constraint regions that are present in a physical space. The obstacle map is processed using a smoothing function and the smoothed map processed with a medial axis transform function to generate a MAT skeleton. The skeleton is pruned to remove spurs and then segmented based on MAT values that are representative of distances in the physical space between the skeleton and an obstacle. The avoidance map is determined by associating constraint regions with the segments. Constraint regions may indicate areas in the physical space that are open for the autonomous mobile device (AMD) to stop, narrow areas for which stopping should be avoided, and closed areas within which the AMD is not to stop during ordinary operation.

20 Claims, 9 Drawing Sheets

(56) References Cited

OTHER PUBLICATIONS

"Morphological Transformations", OpenCV-Python Tutorials, Image Processing in OpenCV, 5 pages. Retrieved from the Internet: URL:https://opencv-python-tutroals.readthedocs.io/en/latest/py_tutorials/py_imgproc/by_morphological_ops/py_morphological_ops.html.
"OpenCV—Distance Transformation", Tutorialspoint, 6 pages. Retrieved from the Internet: URL: https://www.tutorialspoint.com/opencv/opencv_distance_transformation.htm.
"Skeletonization/Medial Axis Transform", HIPR2, 6 pages. Retrieved from the Internet: URL: https://homepages.inf.ed.ac.uk/rbf/HIPR2/skeleton.htm.
"Skeletonize", Scikit-Image, Image Processing in Python, 5 pages. Retrieved from the Internet: URL: https://scikit-image.org/docs/dev/auto_examples/edges/plot_skeleton.html#sphx-glr-auto-examples-edges-plot-skeleton-py.

\* cited by examiner

400

| AVOIDANCE PARAMETERS 402 ||
|---|---|
| THRESHOLD 404 | VALUE 406 |
| $T_{open}$ | (AMD DIAMETER) + (2*(USER DIAMETER)) |
| $T_{closed}$ | (AMD DIAMETER) + (USER DIAMETER) |

| CONSTRAINT DATA 408 ||||
|---|---|---|---|
| REGION TYPE 410 | REGION RANGE(S) 412 | DESCRIPTION 414 | REGION RADIUS 416 |
| FIRST | $MAT(x,y) \geq T_{open}$ | OPEN | None |
| SECOND | $T_{closed} < MAT(x,y) < T_{open}$ | NARROW | $(T_{open}/2) - MAT(x,y)$ |
| THIRD | $MAT(x,y) \leq T_{closed}$ | CLOSED | $MAT(x,y)$ |

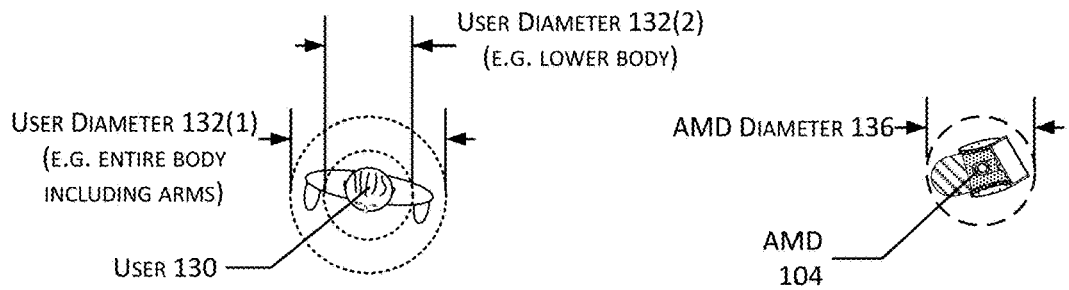

USER DIAMETER 132(2)
(E.G. LOWER BODY)

USER DIAMETER 132(1)
(E.G. ENTIRE BODY INCLUDING ARMS)

AMD DIAMETER 136

USER 130

AMD 104

SYSTEM FOR DETERMINING CONSTRAINT REGIONS FOR AN AUTONOMOUS MOBILE DEVICE

BACKGROUND

Every day a user faces a variety of tasks both personal and work related that need to be attended to. These may include helping in the care of others such as children or the elderly, taking care of a home, staying in contact with others, and so forth. Devices that assist in these tasks may help the user perform the tasks better, may free up the user to do other things, and so forth.

BRIEF DESCRIPTION OF FIGURES

The detailed description is set forth with reference to the accompanying figures. In the figures, the left-most digit(s) of a reference number identifies the figure in which the reference number first appears. The use of the same reference numbers in different figures indicates similar or identical items or features. The figures are not necessarily drawn to scale, and in some figures, the proportions or other aspects may be exaggerated to facilitate comprehension of particular aspects.

FIG. 4A illustrates some parameters associated with determining constraint regions, according to some implementations.

Figure 1:
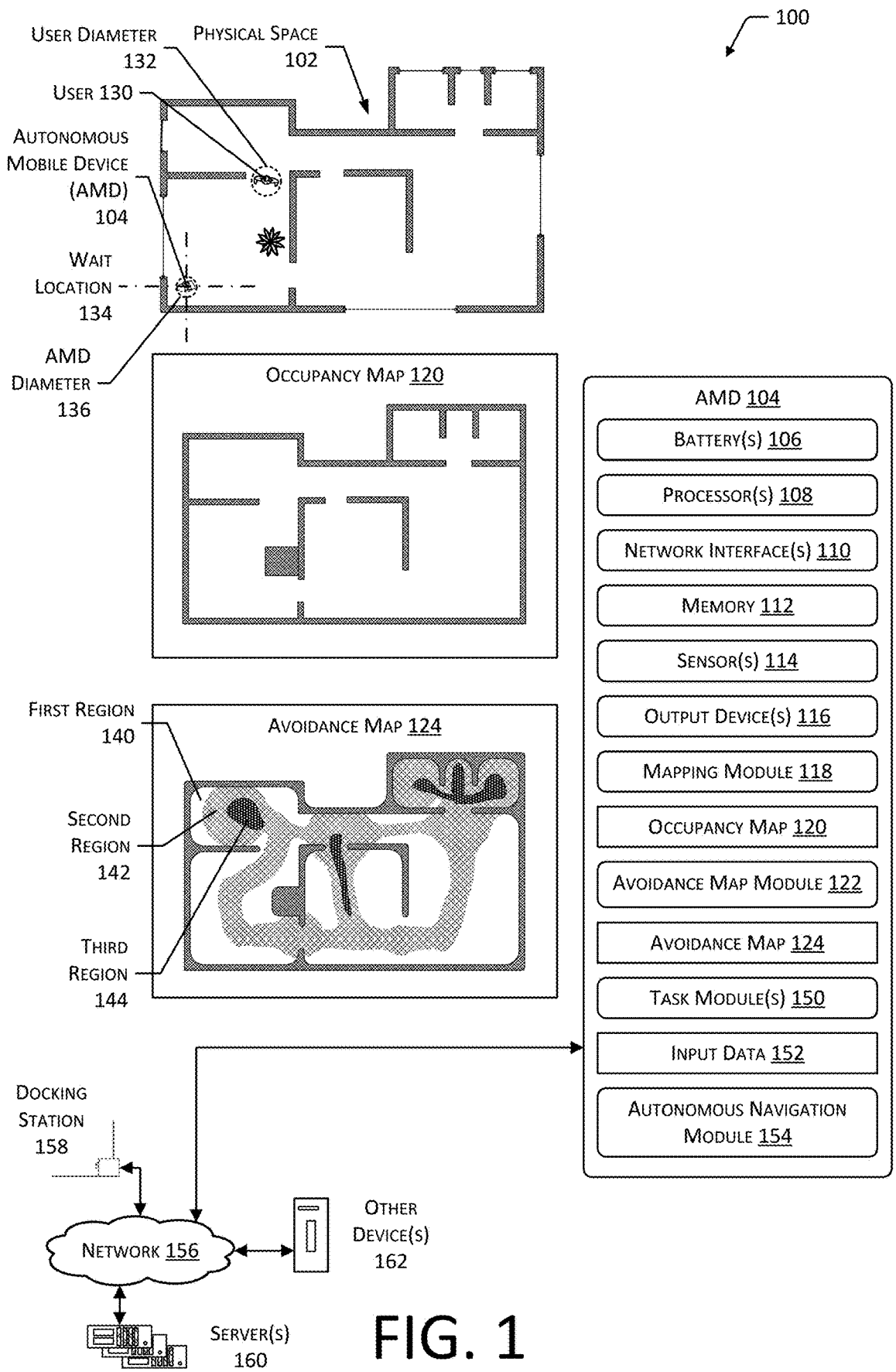
FIG. 1 illustrates a system in which an avoidance map is determined that is indicative of constraint regions in a physical space and used to inform movement of an autonomous mobile device, according to some implementations.

While implementations are described herein by way of example, those skilled in the art will recognize that the implementations are not limited to the examples or figures described. It should be understood that the figures and detailed description thereto are not intended to limit implementations to the particular form disclosed but, on the contrary, the intention is to cover all modifications, equivalents, and alternatives falling within the spirit and scope as defined by the appended claims. The headings used herein are for organizational purposes only and are not meant to be used to limit the scope of the description or the claims. As used throughout this application, the word "may" is used in a permissive sense (i.e., meaning having the potential to), rather than the mandatory sense (i.e., meaning must). Similarly, the words "include", "including", and "includes" mean "including, but not limited to".

DETAILED DESCRIPTION

During operation, an autonomous mobile device (AMD), such as a robot, may perform various tasks. The AMD is capable of autonomous movement, allowing it to move from one location in the physical space to another without being "driven" or remotely controlled by the user or other human. Some of the tasks the AMD performs may involve the AMD moving within the physical space. In addition to the AMD, others are moving within the physical space, such as users, pets, other AMDs, and so forth.

During autonomous operation, it is advantageous for the AMD to have some way to determine whether it can stop in a particular location in the physical space, how quickly to move through an area, where a planned travel route should be, and so forth. For example, the AMD should avoid stopping in a doorway where it could impede a user's movement. In another example, the speed of the AMD may vary, moving more slowly in a narrow hallway to allow a user and the AMD additional time to react to one another, avoid a collision, and allow the user to pass. Continuing the example, the AMD may stay to one side of a hallway, providing space for any users who may come by to pass.

Described in this disclosure are systems and techniques to determine an avoidance map quickly and in a computationally efficient fashion. The avoidance map indicates constraint regions within the physical space. In one implementation, the constraint regions may be open, narrow, or closed. An open region indicates that sufficient space exists for a user to move past the AMD without obstruction. For example, the center of an open room would be an open region. A narrow region is one within which the user may move past the AMD, but with minimum clearance. A closed region is one in which the presence of the AMD would block the user from passing.

An occupancy map indicative of the obstacles in the physical space is generated. For example, sensors onboard the AMD or on other devices may be used to develop an occupancy map representing the locations of obstacles such as furniture, walls, architectural features such as stairwells, and so forth. During operation, the occupancy map may be updated. For example, as the AMD gathers sensor data, the occupancy map may be updated to indicate an obstacle left on the floor, a chair that has moved, and so forth.

Due to a variety of factors, such as sensor noise, mapping algorithms, and so forth, the occupancy map may be "noisy". The occupancy map is processed to produce a smoothed map. For example, the smoothed map may be generated by processing the occupancy map with a despeckling algorithm, a Gaussian blur algorithm, and a thresholding algorithm.

The smoothed map is processed using an algorithm to generate a skeleton indicative of pathways through the smoothed map. In one implementation, a medial axis transform (MAT) algorithm is used to generate a MAT skeleton. The data associated with the MAT skeleton is indicative, for a given location in the physical space, of a MAT value that represents a distance from that location to an obstacle indicated by the smoothed map. For example, the MAT skeleton may extend along the centerline of a hallway, with the MAT values indicating the distance from the skeleton to the walls on either side. In one implementation, the MAT skeleton comprises a plurality of loci, each locus of the plurality of loci being a center of a bi-tangent circle with a radius that equals a distance to a nearest obstacle as indicated by the smoothed map.

A segmented MAT skeleton is determined by thresholding the MAT skeleton into region types based on the MAT values. The parameters used may include an AMD diameter and a user diameter. For example, the AMD diameter may comprise a diameter of a circle within which the AMD is able to turn completely around. In another example, the AMD diameter may comprise a width of the AMD. The user diameter may comprise a width of the user, such as across the shoulders.

A portion of the segmented MAT skeleton may be deemed an "open" type if the MAT value is greater than or equal to a Topen value. The Topen value may be calculated as AMD diameter+2*user diameter. A portion of the segmented MAT skeleton may be deemed a "narrow" type if the MAT value is less than the Topen value and greater than a Tclosed value. The Tclosed value may be calculated as a (Topen/2)−MAT value. A portion of the segmented MAT skeleton may be deemed a "closed" type if the MAT value is less than or equal to Tclosed.

The segmented MAT skeleton may include "spurs" or portions that branch off and extend into corners and so forth. The segmented MAT skeleton may be pruned to remove these spurs, producing a pruned skeleton. In one implementation, pruning may comprise starting at an endpoint of the segmented MAT skeleton. The MAT value associated with that endpoint is compared to the MAT value of an adjacent point. If the MAT value of the endpoint is less than the MAT value of the adjacent point, that endpoint may be omitted from the pruned skeleton.

The pruned skeleton is then used to determine the region type and size of constraint regions within an avoidance map. In one implementation, based on the region type for each point along the pruned skeleton, a constraint region is defined. For example, a first point along the pruned skeleton that is an "open" type would have no radius, as there is no obstruction nearby that would constrain movement. Continuing the example, a second point on the pruned skeleton is a "closed" type. The closed type is specified as having a region radius of the MAT value for that second point. As a result, the avoidance map indicates a closed region for a circular area centered on the second point and extending for a radius equal to the MAT value. The process may be iterated, associating points on the pruned skeleton with corresponding regions to "paint" the avoidance map. A gradient or blurring operation may be applied to the resulting regions to produce the avoidance map.

The avoidance map may then be used to operate the AMD. For example, the AMD may be prohibited from stopping on its own accord at locations in the physical space that are within a closed region as indicated by the avoidance map. In another example, the speed of the AMD may be constrained based on the avoidance map, reducing speed while traversing closed regions and increasing speed while traversing open regions. In yet another example, during operation a notification may be presented to others in the physical space based on the region being traversed. Continuing the example, a notification sound may be presented by the AMD while in a closed region to warn others of its presence. The avoidance map may also be used during route planning for autonomous movement. For example, the route may preferentially extend through open regions while trying to minimize passage through closed and narrow regions. In yet another example, based on the avoidance map, the AMD may select wait locations to stop and wait for further instructions that are in open regions while not stopping and waiting in a narrow or closed region. This prevents the AMD from blocking users or others moving within the physical space.

Illustrative System

FIG. 1 illustrates a system 100 in which an avoidance map is determined that is indicative of constraint regions in a physical space 102 and used to inform movement of an autonomous mobile device (AMD) 104, according to some implementations.

The AMD 104 may include a battery(s) 106 to provide electrical power for operation of the AMD 104. The battery 106 may be rechargeable, allowing it to store electrical energy obtained from an external source. In other implementations a wireless power receiver may be used to provide power for operation of the AMD 104, recharge the battery 106, and so forth. The AMD 104 may include a hardware processor(s) 108 (processors), a network interface(s) 110, a memory(s) 112, sensors 114, and output devices 116. These devices are discussed in more detail with regard to FIGS. 2 and 3.

A mapping module 118 may be stored in the memory 112. The mapping module 118 may use data from the sensors 114 or other devices to determine an occupancy map 120. The occupancy map 120 may comprise data that indicates the location of one or more obstacles. An obstacle may comprise an object or feature that prevents or impairs traversal of the AMD 104. For example, an obstacle may comprise a wall, stairwell, architectural feature, and so forth. In some implementations, the occupancy map 120 may comprise a plurality of cells with each cell of the plurality of cells representing a particular area in the physical space 102 and having an obstacle cost value that is indicative of whether the cell contains an obstacle.

In one implementation, the occupancy map 120 comprises information indicative of a height of an obstacle. For example, a first occupancy map 120(1) is indicative of obstacles that are below a threshold height and a second occupancy map 120(2) is indicative of obstacles that are greater than or equal to the threshold height. Continuing the example, the threshold height may be 70 cm corresponding to a distance between the floor and the tips of an exemplary user's fingers when their arms are at rest on their sides.

An avoidance map module 122 accepts as input the occupancy map 120 and generates an avoidance map 124. The avoidance map 124 is indicative of constraint regions, with respect to the occupancy map 120. As described above, users 130 or others such as pets, other AMDs 104, and so forth may move in the physical space 102. The avoidance map 124 takes into consideration one or more parameters to approximate where in the physical space 102 the presence of the AMD 104 could impede the movement of a user 130. These parameters may include one or more user diameters 132, AMD diameters 136, and so forth. For example, a first user diameter 132(1) may be indicative of a width of the user 130 across their elbows while walking. In another example, a second user diameter 132(2) may be indicative of a width the lower body of the user 130, corresponding to a width of a narrow path that the user 130 would be able to traverse. The second user diameter 132(2) may be associated with movement near low obstacles indicated by the first occupancy map 120(1). For example, the user 130 may walk close to a coffee table, with their right arm extending over this low obstacle.

In some implementations, a first avoidance map 124(1) may be determined that corresponds to low obstacles using the first occupancy map 120(1) and a second avoidance map 124(2) may be determined that corresponds to tall obstacles using the second occupancy map 120(2). For example, the first avoidance map 124(1) may be representative of narrower paths through the physical space 102 in which a portion of the upper body of the user 130 may be expected to move above the low obstacles.

A constraint region is representative of an area within the physical space 102 and is indicative of a region type that may be used to inform operation of the AMD 104. For example, a first region 140 is shown that is an open region. The avoidance map 124 may be used to determine one or more wait locations 134 that are within first regions 140. The AMD 104 may be permitted to autonomously navigate to the wait location 134 and wait there. Waiting or otherwise stopping in an open region would not impede a user 130 from moving past the AMD 104. A second region 142 is a narrow region. Within the narrow region, a user 130 is expected to be able to move past the AMD 104, but with less clearance. A third region 144 is a closed region. A closed region does not provide enough clearance for the user 130 to easily move past the AMD 104. The determination of the avoidance map 124 is discussed in more detail below with respect to FIGS. 4-6C.

One or more task modules 150 may be stored in the memory 112. The task modules 150 may comprise instructions that, when executed by the processor 108 perform a task. For example, a video call module may be used to have the AMD 104 find a particular user and present a video call using the output devices 116. In another example, a sentry task module 150 may be used to have the AMD 104 travel throughout the home and generate a report as to the presence of an unauthorized person.

During operation, the AMD 104 may determine input data 152. The input data 152 may include sensor data from the sensors 114 onboard the AMD 104. For example, the input data 152 may comprise a verbal command provided by the user 130 and detected by a microphone on the AMD 104.

In some situations, the task performed by the AMD 104 may include moving the AMD 104 within the physical space 102. These tasks may involve various behaviors by the AMD 104. These behaviors may include an approach behavior, a follow behavior, an avoid behavior, and so forth. For example, the AMD 104 may be directed to perform a task that includes presenting a video call on a display output device 116 to a first user 130(1). This task may include an avoidance behavior causing the AMD 104 to avoid a second user 130(2) while seeking out the first user 130(1). When found, the AMD 104 uses an approach behavior to move near the first user 130(1).

An autonomous navigation module 154 may use data including the occupancy map 120, the avoidance map 124, data from the sensors 114, and so forth to move the AMD 104 from a first location to a second location in the physical space 102. For example, the task module 150 may determine that the AMD 104 is idle until a previously scheduled task is expected to take place. The autonomous navigation module 154 may receive an instruction to move the AMD 102 to the wait location 134. Responsive to this instruction, the autonomous navigation module 154 may move the AMD 104 to the wait location 134.

By using the techniques and systems described in this disclosure, the AMD 104 is able to move about the physical space 102 in a way that avoids blocking the movement of users 130. Use of the avoidance map 124 improves the ability of the AMD 104 to safely and effectively operate around and with users 130 by constraining the movement of the AMD 104 based on the constraint regions.

In some implementations the determination of a wait location 134 may be based on one or more cost maps in addition to the avoidance map 124. For example, a network map may provide information as to signal strength of a wireless network at particular locations in the physical space 102. Wait locations 134 within the first region 140 may be selected that provide a minimum level of availability, such as received signal strength. In another example, a historical interaction location map may provide information as to previous interactions between the AMD 104 and users 130 at locations within in the physical space 102. The historical interaction location map may be used in conjunction with the avoidance map 124 to determine a wait location 134. For example, the wait location 134 may be close to a location on the user interaction map associated with user interaction, while still being within a first region 140.

The AMD 104 may use the network interfaces 110 to connect to a network 156. For example, the network 156 may comprise a wireless local area network, that in turn is connected to a wide area network such as the Internet.

The AMD 104 may be configured to dock or connect to a docking station 158. The docking station 158 may also be connected to the network 156. For example, the docking station 158 may be configured to connect to the wireless local area network such that the docking station 158 and the AMD 104 may communicate. The docking station 158 may provide external power which the AMD 104 may use to charge the battery 106.

The AMD 104 may access one or more servers 160 via the network 156. For example, the AMD 104 may utilize a wake word detection module to determine if the user 130 is addressing a request to the AMD 104. The wake word detection module may hear a specified word or phrase, transition the AMD 104 or portion thereof to the wake operating mode. Once in the wake mode, the AMD 104 may then transfer at least a portion of the audio spoken by the user 130 to one or more servers 160 for further processing. The servers 160 may process the spoken audio and return to the AMD 104 data that may be subsequently used to operate the AMD 104.

In some implementations, one or more of the functions associated with the avoidance map module 122 may be performed by one or more servers 160. For example, the occupancy map 120 representative of the physical space 102 may be sent to the servers 160 that execute an avoidance map module 122 to determine the avoidance map 124 associated with the physical space 102. The avoidance map 124 may then be sent to the AMD 104 for subsequent use.

The AMD 104 may also communicate with other devices 162. The other devices 162 may include home automation controls, sensors, and so forth that are within the home or associated with operation of one or more devices in the home. For example, the other devices 162 may include a doorbell camera, a garage door, a refrigerator, washing machine, a network connected microphone, and so forth. In some implementations the other devices 162 may include other AMDs 104, vehicles, and so forth.

In other implementations, other types of autonomous mobile devices (AMD) may use the systems and techniques described herein. For example, the AMD may comprise an autonomous ground vehicle that is moving on a street, an autonomous aerial vehicle in the air, autonomous marine vehicle, autonomous factory vehicle, and so forth.

Figure 2:
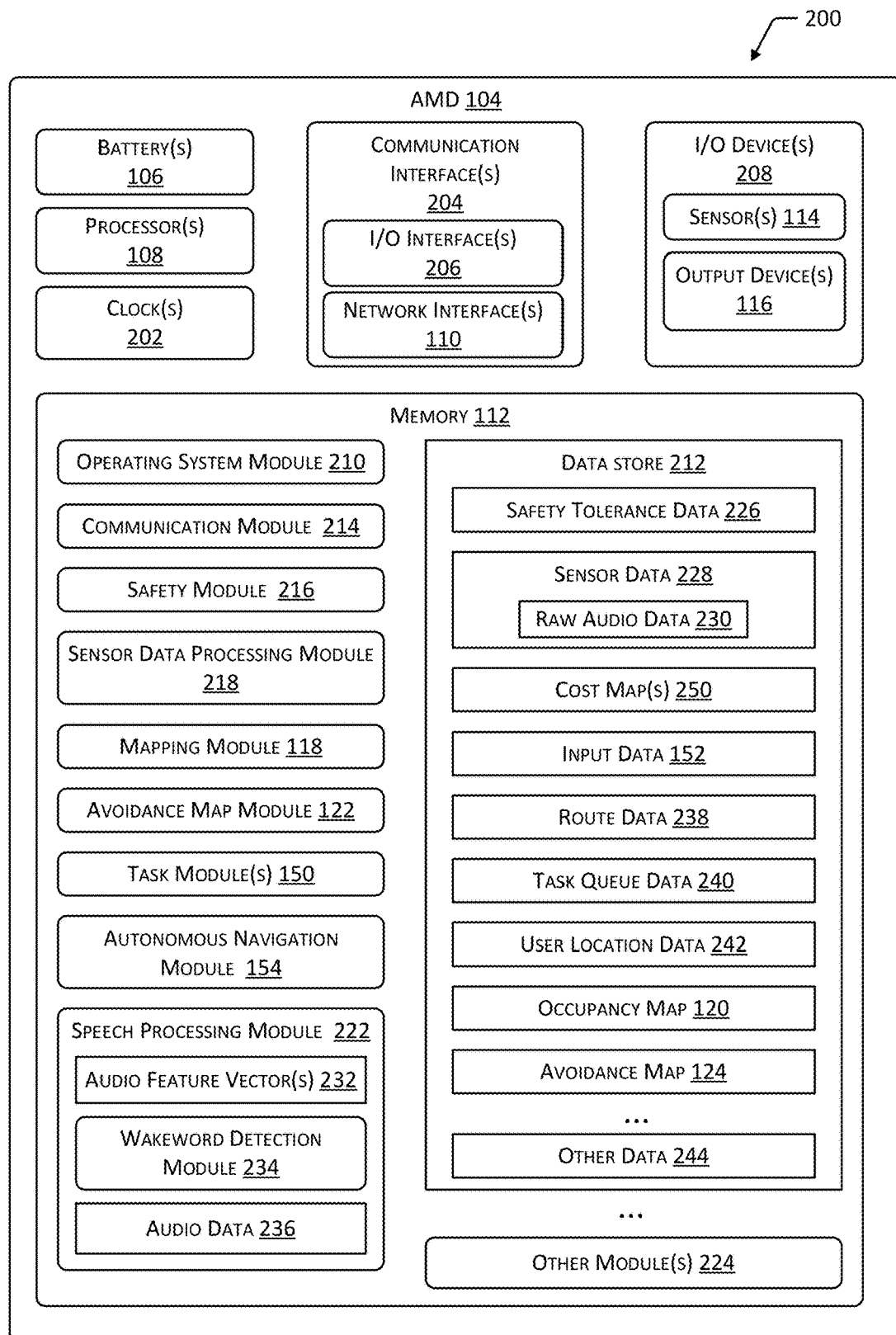
FIG. 2 is a block diagram of the components of the autonomous mobile device, according to some implementations.

FIG. 2 is a block diagram 200 of the AMD 104, according to some implementations. The AMD 104 may include one or more batteries 106 to provide electrical power suitable for operating the components in the AMD 104. In some implementations other devices 162 may be used to provide electrical power to the AMD 104. For example, power may be provided by wireless power transfer, capacitors, fuel cells, storage flywheels, and so forth.

The AMD 104 may include one or more hardware processors 108 (processors) configured to execute one or more stored instructions. The processors 108 may comprise one or more cores. The processors 108 may include microcontrollers, systems on a chip, field programmable gate arrays, digital signal processors, graphic processing units, general processing units, and so forth. One or more clocks 202 may provide information indicative of date, time, ticks, and so forth. For example, the processor 108 may use data from the clock 202 to associate a particular interaction with a particular point in time.

The AMD 104 may include one or more communication interfaces 204 such as input/output (I/O) interfaces 206, network interfaces 110, and so forth. The communication interfaces 204 enable the AMD 104, or components thereof, to communicate with other devices 162 or components. The communication interfaces 204 may include one or more I/O interfaces 206. The I/O interfaces 206 may comprise Inter-Integrated Circuit (I2C), Serial Peripheral Interface bus (SPI), Universal Serial Bus (USB) as promulgated by the USB Implementers Forum, RS-232, and so forth.

The I/O interfaces 206 may couple to one or more I/O devices 208. The I/O devices 208 may include input devices such as one or more of a sensor 114, keyboard, mouse, scanner, and so forth. The I/O devices 208 may also include output devices 116 such as one or more of a motor, light, speaker, display, projector, printer, and so forth. In some embodiments, the I/O devices 208 may be physically incorporated with the AMD 104 or may be externally placed.

The network interfaces 110 may be configured to provide communications between the AMD 104 and other devices 162 such as other robots 104, a docking station 158, routers, access points, and so forth. The network interfaces 110 may include devices configured to couple to personal area networks (PANs), local area networks (LANs), wireless local area networks (WLANS), wide area networks (WANs), and so forth. For example, the network interfaces 110 may include devices compatible with Ethernet, Wi-Fi, Bluetooth, Bluetooth Low Energy, ZigBee, and so forth.

The AMD 104 may also include one or more busses or other internal communications hardware or software that allow for the transfer of data between the various modules and components of the AMD 104.

As shown in FIG. 2, the AMD 104 includes one or more memories 112. The memory 112 may comprise one or more non-transitory computer-readable storage media (CRSM). The CRSM may be any one or more of an electronic storage medium, a magnetic storage medium, an optical storage medium, a quantum storage medium, a mechanical computer storage medium, and so forth. The memory 112 provides storage of computer-readable instructions, data structures, program modules, and other data for the operation of the AMD 104. A few example functional modules are shown stored in the memory 112, although the same functionality may alternatively be implemented in hardware, firmware, or as a system on a chip (SoC).

The memory 112 may include at least one operating system (OS) module 210. The OS module 210 is configured to manage hardware resource devices such as the I/O interfaces 206, the I/O devices 208, the communication interfaces 204, and provide various services to applications or modules executing on the processors 108. The OS module 210 may implement a variant of the FreeBSD operating system as promulgated by the FreeBSD Project; other UNIX or UNIX-like variants; a variation of the Linux operating system as promulgated by Linus Torvalds; the Windows operating system from Microsoft Corporation of Redmond, Washington, USA; the Robot Operating System (ROS) as promulgated at www.ros.org, and so forth.

Also stored in the memory 112 may be a data store 212 and one or more of the following modules. These modules may be executed as foreground applications, background tasks, daemons, and so forth. The data store 212 may use a flat file, database, linked list, tree, executable code, script, or other data structure to store information. In some implementations, the data store 212 or a portion of the data store 212 may be distributed across one or more other devices 162 including other AMDs 104, servers 160, network attached storage devices, and so forth.

A communication module 214 may be configured to establish communication with other devices 162, such as other AMDs 104, an external server 160, a docking station 158, and so forth. The communications may be authenticated, encrypted, and so forth.

Other modules within the memory 112 may include a safety module 216, a sensor data processing module 218, the mapping module 118, the avoidance map module 122, one or more task modules 150, the autonomous navigation module 154, a speech processing module 222, or other modules 224. The modules may access data stored within the data store 212, such as safety tolerance data 226, sensor data 228, cost maps 250, the input data 152, task queue data 240, user location data 242, the avoidance map 124, or other data 244.

The safety module 216 may access safety tolerance data 226 to determine within what tolerances the AMD 104 may operate safely within the physical space 102. For example, the safety module 216 may be configured to stop the AMD 104 from moving when the extensible mast is extended. In another example, the safety tolerance data 226 may specify a minimum sound threshold which, when exceeded, stops all movement of the AMD 104. Continuing this example, detection of sound such as a human yell would stop the AMD 104. In another example, the safety module 216 may access safety tolerance data 226 that specifies a minimum distance from an object that the AMD 104 must maintain. Continuing this example, when a sensor 114 detects an object has approached to less than the minimum distance, all movement of the AMD 104 may be stopped. Movement of the AMD 104 may be stopped by one or more of inhibiting operations of one or more of the motors, issuing a command to stop motor operation, disconnecting power from one or more the motors, and so forth. The safety module 216 may be implemented as hardware, software, or a combination thereof.

Stops initiated by the safety module 216 may be considered non-discretionary stops. For example, the AMD 104 will stop to avoid colliding with a user 130, but the autonomous navigation module 154 had not previously scheduled a stop at the point where the AMD 104 stopped to avoid the collision.

The safety module 216 may control other factors, such as a maximum speed of the AMD 104 based on information obtained by the sensors 114, precision and accuracy of the sensor data 228, and so forth. For example, detection of an object by an optical sensor may include some error, such as when the distance to an object comprises a weighted average between the object and a background. As a result, the maximum speed permitted by the safety module 216 may be based on one or more factors such as the weight of the AMD 104, nature of the floor, distance to the object, and so forth. In the event that the maximum permissible speed differs from the maximum speed permitted by the safety module 216, the lesser speed may be utilized.

The safety module 216 may also limit speed based at least in part on the avoidance map 124. Each region type 410 may be associated with one or more of a minimum speed or a maximum speed. For example, a first maximum speed may be permitted in the first region 140 while a third maximum speed less than the first maximum speed is permitted in the third region 144.

In some implementations the speed may be based at least in part on a skeleton value. For example, the speed may be proportionate to the MAT value of a point in the skeleton data that is closest to the route of the AMD 104.

The sensor data processing module 218 may access sensor data 228 that is acquired from one or more the sensors 114. The sensor data processing module 218 may provide various processing functions such as de-noising, filtering, change detection, and so forth. Processing of sensor data 228, such as images from a camera sensor, may be performed by a module implementing, at least in part, one or more of the following tools or techniques. In one implementation, processing of the image data may be performed, at least in part, using one or more tools available in the OpenCV library as developed by Intel Corporation of Santa Clara, California, USA; Willow Garage of Menlo Park, California, USA; and Itseez of Nizhny Novgorod, Russia, with information available at www.opencv.org. In another implementation, functions available in the OKAO machine vision library as promulgated by Omron Corporation of Kyoto, Japan, may be used to process the sensor data 228. In still another implementation, functions such as those in the Machine Vision Toolbox (MVTB) available using MATLAB as developed by Math Works, Inc. of Natick, Massachusetts, USA, may be utilized.

Techniques such as artificial neural networks (ANNs), convolutional neural networks (CNNs), active appearance models (AAMs), active shape models (ASMs), principal component analysis (PCA), cascade classifiers, and so forth, may also be used to process the sensor data 228 or other data 244. For example, the ANN may be a trained using a supervised learning algorithm such that object identifiers are associated with images of particular objects within training images provided to the ANN. Once trained, the ANN may be provided with the sensor data 228 and produce output indicative of the object identifier.

The sensor data processing module 218 may use data from the sensors 114 on the AMD 104 or other sensors 114 in the physical space 102 to determine the user location data 242 indicative of a user location in the physical space 102. The user location data 242 may be indicative of coordinates within the physical space 102 that are indicative of a point associated with the user 130. For example, the user location data 242 may indicate a centroid of the area occupied by the user 130 with respect to a fixed coordinate system used to represent locations within the physical space 102.

The autonomous navigation module 154 provides the AMD 104 with the ability to navigate within the physical space 102 without real-time human interaction. The autonomous navigation module 154 may implement, or operate in conjunction with, the mapping module 118 to determine the occupancy map 120 or other representation of the physical space 102. In one implementation, the mapping module 118 may use one or more simultaneous localization and mapping ("SLAM") techniques. The SLAM algorithms may utilize one or more of maps, algorithms, beacons, or other techniques to provide navigational data. The navigational data may then be used to determine the route data which is then subsequently used to determine a set of commands that drive the motors connected to the wheels of the AMD 104. For example, the autonomous navigation module 154 may determine a location with the physical space 102, estimate a path to a destination, and so forth.

The AMD 104 autonomous navigation module 154 may generate route data 238 that is indicative of a route through the physical space 102 from a current location to a destination. For example, the route data 238 may comprise information indicative of a series of waypoints within the physical space 102, information indicative of limits to the speed of the AMD 104 during particular portions of the route, and so forth. The autonomous navigation module 154 may use the avoidance map 124 to determine the route data 238. In some implementations the route data 238 may comprise movement instructions that, when executed by one or more processors 108 of the AMD 104, control the movement of the AMD 104.

In one implementation the autonomous navigation module 154 may be configured to determine a route using the avoidance map 124. For example, the autonomous navigation module 154 may avoid, if possible, passing within a threshold distance of a third region 144 indicated by the avoidance map 124 that is designated as a closed region. For example, the AMD 104 may avoid coming within 30 cm of an edge of a third region 144.

In some circumstances the AMD 104 may be permitted to follow a route that passes through an area that is associated with a constraint region. For example, if the cost of an alternative route is greater than a threshold value, the AMD 104 may determine a route that passes through the third region 144.

In another implementation the autonomous navigation module 154 may be configured to avoid having the route stop within a threshold distance of one or more types of constraint regions. For example, the autonomous navigation module 154 may receive instructions to go to a specified location. If the specified location is within a threshold distance of the second region 142 or the third region 144, the autonomous navigation module 154 may determine an alternative location that is beyond the threshold distance. The route data 238 may then comprise a route that ends at the alternative location.

The autonomous navigation module 154 may determine route data 238 that specifies one or more of a minimum speed, a maximum speed, or a range of speeds that the AMD 104 is permitted to travel at for one or more portions of the route. In one implementation, the speed for a portion of the route that passes through or within a threshold distance of the constraint region may be determined to be greater than or equal to a specified minimum speed, less than a specified maximum speed, or within a range of speeds. For example, the route data 238 may specify that the AMD 104 is to travel at no less than 1 meter per second (m/s) and no more than 3 m/s when the route is within a first region 140, and at no more than 1 m/s within a third region 144.

The autonomous navigation module 154 may use data indicative of a current location and accept the wait location data as a destination, and then determine the route data 238 that describes a route to the wait location 134.

The autonomous navigation module 154 may include an obstacle avoidance module. For example, if an obstacle is detected along a planned path, the obstacle avoidance module may re-route the AMD 104 to move around the obstacle or take an alternate path.

The autonomous navigation module 154 may utilize various techniques during processing of sensor data 228. For example, image data obtained from cameras on the AMD 104 may be processed to determine one or more of corners, edges, planes, and so forth. In some implementations, corners may be detected and the coordinates of those corners may be used to produce point cloud data.

The occupancy map 120 or other cost maps 120(M) used by the autonomous navigation module 154 may be manually or automatically determined. Continuing the example, during a learning phase the user may take the AMD 104 on a tour of the physical space 102, allowing the AMD 104 to generate the occupancy map 120 and associated data, such as tags indicating designating a particular room, such as "kitchen" or "bedroom". In another example, during subsequent operation the AMD 104 may generate the occupancy map 120 that is indicative of locations of obstacles such as chairs, doors, stairwells, and so forth as it moves unattended through the physical space 102.

In some implementations, the occupancy map 120 may include floor characterization data. The floor characterization data is indicative of one or more attributes of the floor at a particular location within the physical space 102. During operation of the AMD 104, floor characterization data may be obtained. The floor characterization data may be utilized by one or more of the safety module 216, the autonomous navigation module 154, the task module 150, or other modules 224. For example, the floor characterization data may be used to determine if an unsafe condition occurs such as a wet floor. In another example, the floor characterization data may be used by the autonomous navigation module 154 to assist in the determination of the current location of the AMD 104 within the home. For example, if the autonomous navigation module 154 determines that the AMD 104 is located in the dining room, but the floor characterization data indicates that the floor is consistent with the living room, an error condition may be generated in which other techniques are used to determine the location of the AMD 104 or otherwise resolve the difference. For example, the AMD 104 may attempt to return to the docking station 158 and then, using information about the path traveled, determine the previously ambiguous location within the home.

The floor characterization data may include one or more of a location designator, floor type, floor texture, coefficient of friction, surface resistivity, color, and so forth. The location designator may be specified based on input from the user 130. For example, the AMD 104 may use speech synthesis to ask the user 130 "what room is this?" during a training phase. The utterance of the user 130 may be received by a microphone array and the audio data "this is the living room" may be processed and subsequently used to generate the location designator.

The autonomous navigation module 154 may be used to move the AMD 104 from a first location to a second location within the physical space 102. This movement may be responsive to a determination made by an onboard processor 108, in response to a command received via one or more communication interfaces 204 or a sensor 114, and so forth. For example, an external server 160 may send a command that is subsequently received using a network interface 110. This command may direct the AMD 104 to proceed to a designated destination, such as "living room" or "dining room". The AMD 104 may then process this command, and use the autonomous navigation module 154 to determine the directions and distances associated with reaching the specified destination.

The memory 112 may store the one or more task modules 150. The task module 150 comprises instructions that, when executed, provide one or more functions associated with a particular task. In one example, the task may comprise a security or sentry task in which the AMD 104 travels throughout the physical space 102 avoiding users 130 and looking for events that exceed predetermined thresholds. In another example, the task may comprise a "follow me" feature in which the AMD 104 follows a user 130 using a follow behavior.

In some implementations, the AMD 104 may be determined to be idle based on the task queue data 240. Tasks that are to be performed may be enqueued in the task queue data 240. The task module 150 may then read the queue and process the enqueued tasks. If the task queue data 240 is empty, or the next enqueued task is not scheduled for execution for a period of time that is greater than a threshold value from the current time, the AMD 104 may be deemed to be idle and the autonomous navigation module 154 may be used to move the AMD 104 to the wait location 134.

The speech processing module 222 may be used to process utterances of the user 130. Microphones may acquire audio in the presence of the AMD 104 and may send raw audio data 230 to an acoustic front end (AFE). The AFE may transform the raw audio data 230 (for example, a single-channel, 16-bit audio stream sampled at 16 kHz), captured by the microphone, into audio feature vectors 232 that may ultimately be used for processing by various components, such as a wakeword detection module 234, speech recognition engine, or other components. The AFE may reduce noise in the raw audio data 230. The AFE may also perform acoustic echo cancellation (AEC) or other operations to account for output audio data that may be sent to a speaker of the AMD 104 for output. For example, the AMD 104 may be playing music or other audio that is being received from a network 156 in the form of output audio data. To avoid the output audio interfering with the device's ability to detect and process input audio, the AFE or other component may perform echo cancellation to remove the output audio data from the input raw audio data 230, or other operations.

The AFE may divide the audio data into frames representing time intervals for which the AFE determines a number of values (i.e., features) representing qualities of the raw audio data 230, along with a set of those values (i.e., a feature vector or audio feature vector 232) representing features/qualities of the raw audio data 230 within each frame. A frame may be a certain period of time, for example a sliding window of 25 ms of audio data 236 taken every 10 ms, or the like. Many different features may be determined, as known in the art, and each feature represents some quality of the audio that may be useful for automatic speech recognition (ASR) processing, wakeword detection, presence detection, or other operations. A number of approaches may be used by the AFE to process the raw audio data 230, such as mel-frequency cepstral coefficients (MFCCs), log filter-bank energies (LFBEs), perceptual linear predictive (PLP) techniques, neural network feature vector techniques, linear discriminant analysis, semi-tied covariance matrices, or other approaches known to those skilled in the art.

The audio feature vectors 232 (or the raw audio data 230) may be input into a wakeword detection module 234 that is configured to detect keywords spoken in the audio. The wakeword detection module 234 may use various techniques to determine whether audio data 236 includes speech. Some embodiments may apply voice activity detection (VAD) techniques. Such techniques may determine whether speech is present in an audio input based on various quantitative aspects of the audio input, such as the spectral slope between one or more frames of the audio input; the energy levels of the audio input in one or more spectral bands; the signal-to-noise ratios of the audio input in one or more spectral bands; or other quantitative aspects. In other embodiments, the AMD 104 may implement a limited classifier configured to distinguish speech from background noise. The classifier may be implemented by techniques such as linear classifiers, support vector machines, and decision trees. In still other embodiments, Hidden Markov Model (HMM) or Gaussian Mixture Model (GMM) techniques may be applied to compare the audio input to one or more acoustic models in speech storage, which acoustic models may include models corresponding to speech, noise (such as physical spatial noise or background noise), or silence. Still other techniques may be used to determine whether speech is present in the audio input.

Once speech is detected in the audio received by the AMD 104 (or separately from speech detection), the AMD 104 may use the wakeword detection module 234 to perform wakeword detection to determine when a user 130 intends to speak a command to the AMD 104. This process may also be referred to as keyword detection, with the wakeword being a specific example of a keyword. Specifically, keyword detection is typically performed without performing linguistic analysis, textual analysis, or semantic analysis. Instead, incoming audio (or audio data 236) is analyzed to determine if specific characteristics of the audio match preconfigured acoustic waveforms, audio signatures, or other data to determine if the incoming audio "matches" stored audio data 236 corresponding to a keyword.

Thus, the wakeword detection module 234 may compare audio data 236 to stored models or data to detect a wakeword. One approach for wakeword detection applies general large vocabulary continuous speech recognition (LVCSR) systems to decode the audio signals, with wakeword searching conducted in the resulting lattices or confusion networks. LVCSR decoding may require relatively high computational resources. Another approach for wakeword spotting builds HMMs for each key wakeword word and non-wakeword speech signals respectively. The non-wakeword speech includes other spoken words, background noise, etc. There can be one or more HMMs built to model the non-wakeword speech characteristics, which are named filler models. Viterbi decoding is used to search the best path in the decoding graph, and the decoding output is further processed to make the decision on keyword presence. This approach can be extended to include discriminative information by incorporating a hybrid deep neural network (DNN) Hidden Markov Model (HMM) decoding framework. In another embodiment, the wakeword spotting system may be built on DNN/recursive neural network (RNN) structures directly, without HMM involved. Such a system may estimate the posteriors of wakewords with context information, either by stacking frames within a context window for DNN, or using RNN. Following on, posterior threshold tuning or smoothing is applied for decision making. Other techniques for wakeword detection, such as those known in the art, may also be used.

Once the wakeword is detected, circuitry or applications of the local AMD 104 may "wake" and begin transmitting audio data 236 (which may include one or more audio feature vectors 232 or the raw audio data 230) to one or more server(s) 160 for speech processing. The audio data 236 corresponding to audio obtained by the microphone may be sent to a server 160 for routing to a recipient device or may be sent to the server 160 for speech processing for interpretation of the included speech (either for purposes of enabling voice-communications and/or for purposes of executing a command in the speech). The audio data 236 may include data corresponding to the wakeword, or the portion of the audio data 236 corresponding to the wakeword may be removed by the local AMD 104 prior to sending.

The AMD 104 may connect to the network 156 using one or more of the network interfaces 110. One or more servers 160 may provide various functions, such as ASR, natural language understanding (NLU), providing content such as audio or video to the AMD 104, and so forth.

The other modules 224 may provide other functionality, such as object recognition, speech synthesis, user identification, and so forth. For example, an automated speech recognition (ASR) module may accept as input raw audio data 230 or audio feature vectors 232 and may produce as output a text string that is further processed and used to provide input to a task module 150, and so forth. In one implementation, the text string may be sent via a network 156 to a server 160 for further processing. The AMD 104 may receive a response from the server 160 and present output, perform an action, and so forth. For example, the raw audio data 230 may include the user 130 saying "robot go to the dining room". The audio data 236 representative of this utterance may be sent to the server 160 that returns commands directing the AMD 104 to the dining room of the home associated with the AMD 104.

The utterance may result in a response from the server 160 that directs operation of other devices 162 or services. For example, the user 130 may say "robot wake me at seven tomorrow morning". The audio data 236 may be sent to the server 160 that determines the intent and generates commands to instruct a device attached to the network 156 to play an alarm at 7:00 am the next day.

The other modules 224 may comprise a speech synthesis module that is able to convert text data to human speech. For example, the speech synthesis module may be used by the AMD 104 to provide speech that a user 130 is able to understand.

The data store 212 may store other data 244 as well. For example, localization settings may indicate local preferences such as language. User identifier data may be stored that allows for identification of a particular user 130. In some implementations data, such as the user location data 242, a historical interaction location map, and so forth may be associated with or indicative of the particular user identifier. For example, the historical interaction location map may contain data that indicates interactions with respect to particular user identifiers.

Figure 3:
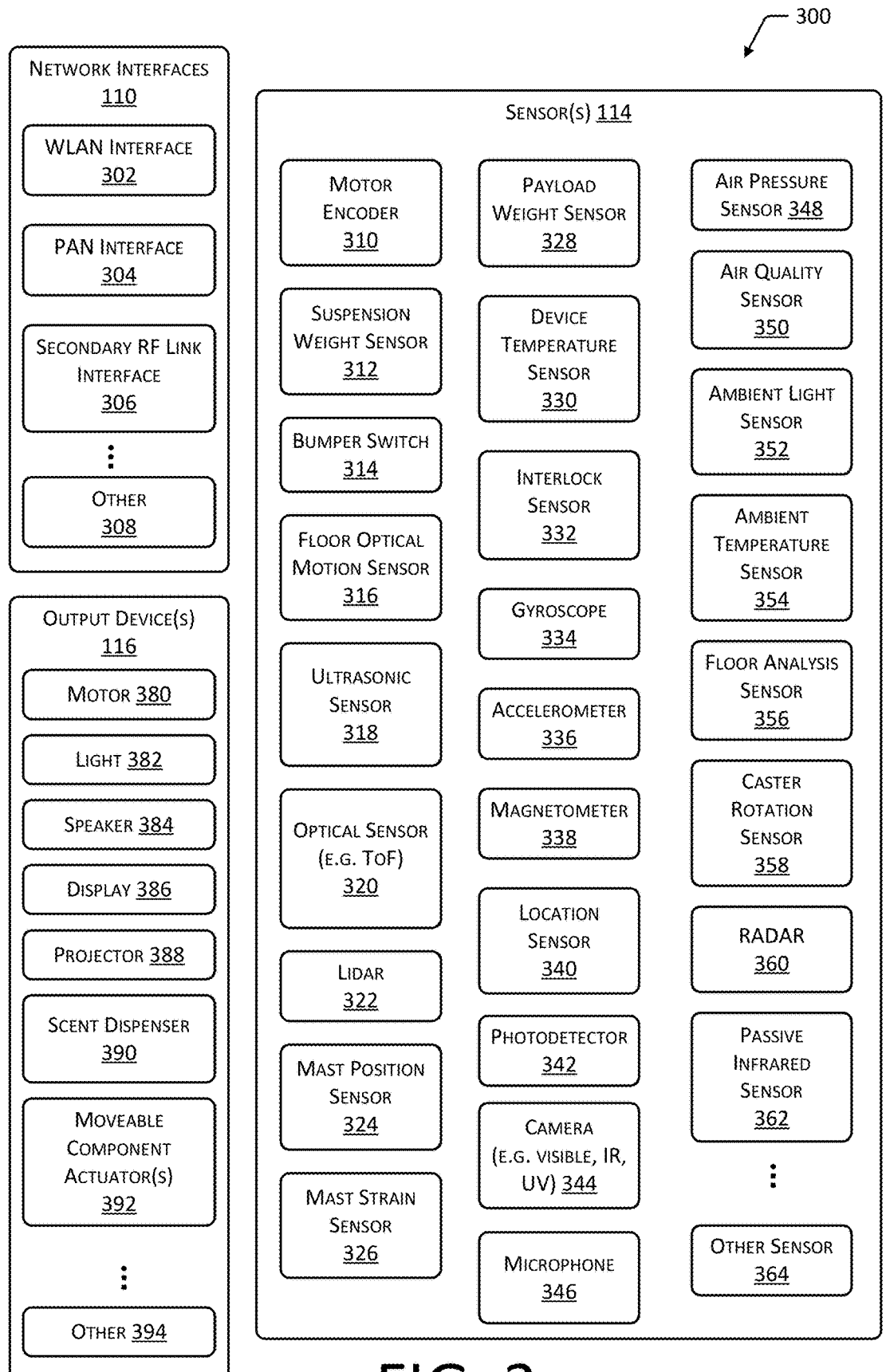
FIG. 3 is a block diagram of some components of the autonomous mobile device such as network interfaces, sensors, and output devices, according to some implementations.

FIG. 3 is a block diagram 300 of some components of the AMD 104 such as network interfaces 110, sensors 114, and output devices 116, according to some implementations. The components illustrated here are provided by way of illustration and not necessarily as a limitation. For example, the AMD 104 may utilize a subset of the particular network interfaces 110, output devices 116, or sensors 114 depicted here, or may utilize components not pictured. One of more of the sensors 114, output devices 116, or a combination thereof may be included on a moveable component that may be panned, tilted, rotated, or any combination thereof with respect to a chassis of the AMD 104.

The network interfaces 110 may include one or more of a WLAN interface 302, PAN interface 304, secondary radio frequency (RF) link interface 306, or other interfaces 308. The WLAN interface 302 may be compliant with at least a portion of the Wi-Fi specification. For example, the WLAN interface 302 may be compliant with the least a portion of the IEEE 802.11 specification as promulgated by the Institute of Electrical and Electronics Engineers (IEEE). The PAN interface 304 may be compliant with at least a portion of one or more of the Bluetooth, wireless USB, Z-Wave, ZigBee, or other standards. For example, the PAN interface 304 may be compliant with the Bluetooth Low Energy (BLE) specification.

The secondary RF link interface 306 may comprise a radio transmitter and receiver that operate at frequencies different from or using modulation different from the other interfaces. For example, the WLAN interface 302 may utilize frequencies in the 2.4 GHz and 5 GHz Industrial Scientific and Medicine (ISM) bands, while the PAN interface 304 may utilize the 2.4 GHz ISM bands. The secondary RF link interface 306 may comprise a radio transmitter that operates in the 900 MHz ISM band, within a licensed band at another frequency, and so forth. The secondary RF link interface 306 may be utilized to provide backup communication between the AMD 104 and other devices 162 in the event that communication fails using one or more of the WLAN interface 302 or the PAN interface 304. For example, in the event the AMD 104 travels to an area within the physical space 102 that does not have Wi-Fi coverage, the AMD 104 may use the secondary RF link interface 306 to communicate with another device such as a specialized access point, docking station 158, or other AMD 104.

The other 308 network interfaces may include other equipment to send or receive data using other wavelengths or phenomena. For example, the other 308 network interface may include an ultrasonic transceiver used to send data as ultrasonic sounds, a visible light system that communicates by modulating a visible light source such as a light-emitting diode, and so forth. In another example, the other 308 network interface may comprise a wireless wide area network (WWAN) interface or a wireless cellular data network interface. Continuing the example, the other 308 network interface may be compliant with at least a portion of the 3G, 4G, LTE, or other standards.

The AMD 104 may include one or more of the following sensors 114. The sensors 114 depicted here are provided by way of illustration and not necessarily as a limitation. It is understood that other sensors 114 may be included or utilized by the AMD 104, while some sensors 114 may be omitted in some configurations.

A motor encoder 310 provides information indicative of the rotation or linear extension of a motor 380. The motor 380 may comprise a rotary motor, or a linear actuator. In some implementations, the motor encoder 310 may comprise a separate assembly such as a photodiode and encoder wheel that is affixed to the motor 380. In other implementations, the motor encoder 310 may comprise circuitry configured to drive the motor 380. For example, the autonomous navigation module 154 may utilize the data from the motor encoder 310 to estimate a distance traveled.

A suspension weight sensor 312 provides information indicative of the weight of the AMD 104 on the suspension system for one or more of the wheels or the caster. For example, the suspension weight sensor 312 may comprise a switch, strain gauge, load cell, photodetector, or other sensing element that is used to determine whether weight is applied to a particular wheel, or whether weight has been removed from the wheel. In some implementations, the suspension weight sensor 312 may provide binary data such as a "1" value indicating that there is a weight applied to the wheel, while a "0" value indicates that there is no weight applied to the wheel. In other implementations, the suspension weight sensor 312 may provide an indication such as so many kilograms of force or newtons of force. The suspension weight sensor 312 may be affixed to one or more of the wheels or the caster. In some situations, the safety module 216 may use data from the suspension weight sensor 312 to determine whether or not to inhibit operation of one or more of the motors 380. For example, if the suspension weight sensor 312 indicates no weight on the suspension, the implication is that the AMD 104 is no longer resting on its wheels, and thus operation of the motors 380 may be inhibited. In another example, if the suspension weight sensor 312 indicates weight that exceeds a threshold value, the implication is that something heavy is resting on the AMD 104 and thus operation of the motors 380 may be inhibited.

One or more bumper switches 314 provide an indication of physical contact between a bumper or other member that is in mechanical contact with the bumper switch 314. The safety module 216 utilizes sensor data 228 obtained by the bumper switches 314 to modify the operation of the AMD 104. For example, if the bumper switch 314 associated with a front of the AMD 104 is triggered, the safety module 216 may initiate a non-discretionary stop, drive the AMD 104 backwards, or take other action to avoid or mitigate a collision.

A floor optical motion sensor (FOMS) 316 provides information indicative of motion of the AMD 104 relative to the floor or other surface underneath the AMD 104. In one implementation, the FOMS 316 may comprise a light source such as light-emitting diode (LED), an array of photodiodes, and so forth. In some implementations, the FOMS 316 may utilize an optoelectronic sensor, such as a low-resolution two-dimensional array of photodiodes. Several techniques may be used to determine changes in the data obtained by the photodiodes and translate this into data indicative of a direction of movement, velocity, acceleration, and so forth. In some implementations, the FOMS 316 may provide other information, such as data indicative of a pattern present on the floor, composition of the floor, color of the floor, and so forth. For example, the FOMS 316 may utilize an optoelectronic sensor that may detect different colors or shades of gray, and this data may be used to generate floor characterization data.

An ultrasonic sensor 318 utilizes sounds in excess of 20 kHz to determine a distance from the sensor 114 to an object. The ultrasonic sensor 318 may comprise an emitter such as a piezoelectric transducer and a detector such as an ultrasonic microphone. The emitter may generate specifically timed pulses of ultrasonic sound while the detector listens for an echo of that sound being reflected from an object within the field of view. The ultrasonic sensor 318 may provide information indicative of presence of an object, distance to the object, and so forth. Two or more ultrasonic sensors 318 may be utilized in conjunction with one another to determine a location within a two-dimensional plane of the object.

In some implementations, the ultrasonic sensor 318 or a portion thereof may be used to provide other functionality. For example, the emitter of the ultrasonic sensor 318 may be used to transmit data and the detector may be used to receive data transmitted that is ultrasonic sound. In another example, the emitter of an ultrasonic sensor 318 may be set to a particular frequency and used to generate a particular waveform such as a sawtooth pattern to provide a signal that is audible to an animal, such as a dog or a cat.

An optical sensor 320 may provide sensor data 228 indicative of one or more of a presence or absence of an object, a distance to the object, or characteristics of the object. The optical sensor 320 may use time-of-flight (ToF), structured light, interferometry, or other techniques to generate the distance data. For example, ToF determines a propagation time (or "round-trip" time) of a pulse of emitted light from an optical emitter or illuminator that is reflected or otherwise returned to an optical detector. By dividing the propagation time in half and multiplying the result by the speed of light in air, the distance to an object may be determined. The optical sensor 320 may utilize one or more sensing elements. For example, the optical sensor 320 may comprise a 4×4 array of light sensing elements. Each individual sensing element may be associated with a field of view (FOV) that is directed in a different way. For example, the optical sensor 320 may have four light sensing elements, each associated with a different 10° FOV, allowing the sensor to have an overall FOV of 40°.

In another implementation, a structured light pattern may be provided by the optical emitter. A portion of the structured light pattern may then be detected on the object using a sensor 114 such as an image sensor or camera 344. Based on an apparent distance between the features of the structured light pattern, the distance to the object may be calculated. Other techniques may also be used to determine distance to the object. In another example, the color of the reflected light may be used to characterize the object, such as whether the object is skin, clothing, flooring, upholstery, and so forth. In some implementations, the optical sensor 320 may operate as a depth camera, providing a two-dimensional image of a scene, as well as data that indicates a distance to each pixel.

Data from the optical sensors 320 may be utilized for collision avoidance. For example, the safety module 216 and the autonomous navigation module 154 may utilize the sensor data 228 indicative of the distance to an object in order to prevent a collision with that object.

Multiple optical sensors 320 may be operated such that their FOV overlap at least partially. To minimize or eliminate interference, the optical sensors 320 may selectively control one or more of the timing, modulation, or frequency of the light emitted. For example, a first optical sensor 320 may emit light modulated at 30 kHz while a second optical sensor 320 emits light modulated at 33 kHz.

A lidar 322 sensor provides information indicative of a distance to an object or portion thereof by utilizing laser light. The laser is scanned across a scene at various points, emitting pulses which may be reflected by objects within the scene. Based on the time-of-flight distance to that particular point, sensor data 228 may be generated that is indicative of the presence of objects and the relative positions, shapes, and so forth that is visible to the lidar 322. Data from the lidar 322 may be used by various modules. For example, the autonomous navigation module 154 may utilize point cloud data generated by the lidar 322 for localization of the AMD 104 within the physical space 102.

The AMD 104 may include a mast. A mast position sensor 324 provides information indicative of a position of the mast of the AMD 104. For example, the mast position sensor 324 may comprise limit switches associated with the mast extension mechanism that indicate whether the mast is an extended or retracted position. In other implementations, the mast position sensor 324 may comprise an optical code on at least a portion of the mast that is then interrogated by an optical emitter and a photodetector to determine the distance which the mast is extended. In another implementation, the mast position sensor 324 may comprise an encoder wheel that is attached to a mast motor that is used to raise or lower the mast. The mast position sensor 324 may provide data to the safety module 216. For example, if the AMD 104 is preparing to move, data from the mast position sensor 324 may be checked to determine if the mast is retracted, and if not, the mast may be retracted prior to beginning movement.

A mast strain sensor 326 provides information indicative of a strain on the mast with respect to the remainder of the AMD 104. For example, the mast strain sensor 326 may comprise a strain gauge or load cell that measures a side-load applied to the mast, a weight on the mast, or downward pressure on the mast. The safety module 216 may utilize sensor data 228 obtained by the mast strain sensor 326. For example, if the strain applied to the mast exceeds a threshold amount, the safety module 216 may direct an audible and visible alarm to be presented by the AMD 104.

The AMD 104 may include a modular payload bay. A payload weight sensor 328 provides information indicative of the weight associated with the modular payload bay. The payload weight sensor 328 may comprise one or more sensing mechanisms to determine the weight of a load. These sensing mechanisms may include piezoresistive devices, piezoelectric devices, capacitive devices, electromagnetic devices, optical devices, potentiometric devices, microelectromechanical devices, and so forth. The sensing mechanisms may operate as transducers that generate one or more signals based on an applied force, such as that of the load due to gravity. For example, the payload weight sensor 328 may comprise a load cell having a strain gauge and a structural member that deforms slightly when weight is applied. By measuring a change in the electrical characteristic of the strain gauge, such as capacitance or resistance, the weight may be determined. In another example, the payload weight sensor 328 may comprise a force sensing resistor (FSR). The FSR may comprise a resilient material that changes one or more electrical characteristics when compressed. For example, the electrical resistance of a particular portion of the FSR may decrease as the particular portion is compressed. In some implementations, the safety module 216 may utilize the payload weight sensor 328 to determine if the modular payload bay has been overloaded. If so, an alert or notification may be issued.

One or more device temperature sensors 330 may be utilized by the AMD 104. The device temperature sensors 330 provide temperature data of one or more components within the AMD 104. For example, a device temperature sensor 330 may indicate a temperature of one or more the batteries 106, one or more motors 380, and so forth. In the event the temperature exceeds a threshold value, the component associated with that device temperature sensor 330 may be shut down.

One or more interlock sensors 332 may provide data to the safety module 216 or other circuitry that prevents the AMD 104 from operating in an unsafe condition. For example, the interlock sensors 332 may comprise switches that indicate whether an access panel is open. The interlock sensors 332 may be configured to inhibit operation of the AMD 104 until the interlock switch indicates a safe condition is present.

A gyroscope 334 may provide information indicative of rotation of an object affixed thereto. For example, the gyroscope 334 may generate sensor data 228 that is indicative of a change in orientation of the AMD 104 or portion thereof.

An accelerometer 336 provides information indicative of a direction and magnitude of an imposed acceleration. Data such as rate of change, determination of changes in direction, speed, and so forth may be determined using the accelerometer 336. The accelerometer 336 may comprise mechanical, optical, micro-electromechanical, or other devices. For example, the gyroscope 334 in the accelerometer 336 may comprise a prepackaged solid-state inertial measurement unit (IMU) that provides multiple axis gyroscopes 334 and accelerometers 336.

A magnetometer 338 may be used to determine an orientation by measuring ambient magnetic fields, such as the terrestrial magnetic field. For example, the magnetometer 338 may comprise a Hall effect transistor that provides output compass data indicative of a magnetic heading.

The AMD 104 may include one or more location sensors 340. The location sensors 340 may comprise an optical, radio, or other navigational system such as a global positioning system (GPS) receiver. For indoor operation, the location sensors 340 may comprise indoor position systems, such as using Wi-Fi Positioning Systems (WPS). The location sensors 340 may provide information indicative of a relative location, such as "living room" or an absolute location such as particular coordinates indicative of latitude and longitude, or displacement with respect to a predefined origin.

A photodetector 342 provide sensor data 228 indicative of impinging light. For example, the photodetector 342 may provide data indicative of a color, intensity, duration, and so forth.

A camera 344 generates sensor data 228 indicative of one or more images. The camera 344 may be configured to detect light in one or more wavelengths including, but not limited to, terahertz, infrared, visible, ultraviolet, and so forth. For example, an infrared camera 344 may be sensitive to wavelengths between approximately 700 nanometers and 1 millimeter. The camera 344 may comprise charge coupled devices (CCD), complementary metal oxide semiconductor (CMOS) devices, microbolometers, and so forth. The AMD 104 may use image data acquired by the camera 344 for object recognition, navigation, collision avoidance, user communication, and so forth. For example, a pair of cameras 344 sensitive to infrared light may be mounted on the front of the AMD 104 to provide binocular stereo vision, with the sensor data 228 comprising images being sent to the autonomous navigation module 154. In another example, the camera 344 may comprise a 10 megapixel or greater camera that is used for videoconferencing or for acquiring pictures for the user 130.

The camera 344 may include a global shutter or a rolling shutter. The shutter may be mechanical or electronic. A mechanical shutter uses a physical device such as a shutter vane or liquid crystal to prevent light from reaching a light sensor. In comparison, an electronic shutter comprises a specific technique of how the light sensor is read out, such as progressive rows, interlaced rows, and so forth. With a rolling shutter, not all pixels are exposed at the same time. For example, with an electronic rolling shutter, rows of the light sensor may be read progressively, such that the first row on the sensor was taken at a first time while the last row was taken at a later time. As a result, a rolling shutter may produce various image artifacts, especially with regard to images in which objects are moving. In contrast, with a global shutter the light sensor is exposed all at a single time, and subsequently read out. In some implementations, the camera(s) 344, particularly those associated with navigation or autonomous operation, may utilize a global shutter. In other implementations, the camera(s) 344 providing images for use by the autonomous navigation module 154 may be acquired using a rolling shutter and subsequently may be processed to mitigate image artifacts.

One or more microphones 346 may be configured to acquire information indicative of sound present in the physical space 102. In some implementations, arrays of microphones 346 may be used. These arrays may implement beamforming techniques to provide for directionality of gain. The AMD 104 may use the one or more microphones 346 to acquire information from acoustic tags, accept voice input from users 130, determine ambient noise level, for voice communication with another user 130 or system, and so forth.

An air pressure sensor 348 may provide information indicative of an ambient atmospheric pressure or changes in ambient atmospheric pressure. For example, the air pressure sensor 348 may provide information indicative of changes in air pressure due to opening and closing of doors, weather events, and so forth.

An air quality sensor 350 may provide information indicative of one or more attributes of the ambient atmosphere. For example, the air quality sensor 350 may include one or more chemical sensing elements to detect the presence of carbon monoxide, carbon dioxide, ozone, and so forth. In another example, the air quality sensor 350 may comprise one or more elements to detect particulate matter in the air, such as the photoelectric detector, ionization chamber, and so forth. In another example, the air quality sensor 350 may include a hygrometer that provides information indicative of relative humidity.

An ambient light sensor 352 may comprise one or more photodetector's or other light-sensitive elements that are used to determine one or more of the color, intensity, or duration of ambient lighting around the AMD 104.

An ambient temperature sensor 354 provides information indicative of the temperature of the ambient physical space proximate to the AMD 104. In some implementations, an infrared temperature sensor may be utilized to determine the temperature of another object at a distance.

A floor analysis sensor 356 may include one or more components that are used to generate at least a portion of the floor characterization data. In one implementation, the floor analysis sensor 356 may comprise circuitry that may be used to determine one or more of the electrical resistance, electrical inductance, or electrical capacitance of the floor. For example, two or more of the wheels in contact with the floor may include an allegedly conductive pathway between the circuitry and the floor. By using two or more of these wheels, the circuitry may measure one or more of the electrical properties of the floor. Information obtained by the floor analysis sensor 356 may be used by one or more of the safety module 216, the autonomous navigation module 154, the task module 150, and so forth. For example, if the floor analysis sensor 356 determines that the floor is wet, the safety module 216 may decrease the speed of the AMD 104 and generate a notification alerting the user 130.

The floor analysis sensor 356 may include other components as well. For example, a coefficient of friction sensor may comprise a probe that comes into contact with the surface and determines the coefficient of friction between the probe and the floor.

A caster rotation sensor 358 provides data indicative of one or more of a direction of orientation, angular velocity, linear speed of the caster, and so forth. For example, the caster rotation sensor 358 may comprise an optical encoder and corresponding target that is able to determine that the caster transitioned from an angle of 0° at a first time to 49° at a second time.

The sensors 114 may include a radar 360. The radar 360 may be used to provide information as to a distance, lateral position, and so forth, to an object.

The sensors 114 may include a passive infrared (PIR) sensor 362. The PIR sensor 362 may be used to detect the presence of people, pets, hotspots, and so forth. For example, the PIR sensor 362 may be configured to detect infrared radiation with wavelengths between 8 and 14 micrometers.

The AMD 104 may include other sensors 364 as well. For example, a capacitive proximity sensor may be used to provide proximity data to adjacent objects. Other sensors 364 may include radio frequency identification (RFID) readers, near field communication (NFC) systems, coded aperture cameras, and so forth. For example, NFC tags may be placed at various points within the physical space 102 to provide landmarks for the autonomous navigation module 154. One or more touch sensors may be utilized to determine contact with a user 130 or other objects.

The AMD 104 may include one or more output devices 116. A motor 380 may be used to provide linear or rotary motion. A light 382 may be used to emit photons. A speaker 384 may be used to emit sound. A display 386 may comprise one or more of a liquid crystal display, light emitting diode display, electrophoretic display, cholesteric liquid crystal display, interferometric display, and so forth. The display 386 may be used to present visible information such as graphics, pictures, text, and so forth. In some implementations, the display 386 may comprise a touchscreen that combines a touch sensor and a display 386.

In some implementations, the AMD 104 may be equipped with a projector 388. The projector 388 may be able to project an image on a surface, such as the floor, wall, ceiling, and so forth.

A scent dispenser 390 may be used to emit one or more smells. For example, the scent dispenser 390 may comprise a plurality of different scented liquids that may be evaporated or vaporized in a controlled fashion to release predetermined amounts of each.

One or more moveable component actuators 392 may comprise an electrically operated mechanism such as one or more of a motor, solenoid, piezoelectric material, electroactive polymer, shape-memory alloy, and so forth. The actuator controller may be used to provide a signal or other input that operates one or more of the moveable component actuators 392 to produce movement of the moveable component.

In other implementations, other 394 output devices may be utilized. For example, the AMD 104 may include a haptic output device that provides output that produces particular touch sensations to the user 130. Continuing the example, a motor 380 with an eccentric weight may be used to create a buzz or vibration to allow the AMD 104 to simulate the purr of a cat.

FIG. 4A illustrates at 400 some parameters associated with determining constraint regions in the avoidance map 124, according to some implementations. A user diameter 132 determined. In some implementations, the user diameter 132 may be a single value used across all users 130. For example, a user diameter 132 of 60 cm may be specified for all users 130. In other implementations, the user diameter 132 may be associated with different categories of user 130, such as child, adult, limited mobility, and so forth. For example, different user diameters 132 may be specified for users 130 who utilize assistive devices such as a wheelchair, crutches, walker, and so forth.

The AMD diameter 136 may be based on one or more of maximum width of the AMD 104, maximum length of the AMD 104, turning radius, and so forth. For example, the AMD diameter 136 may comprise a diameter of an outermost projection of the AMD 104 while turning 360 degrees.

The avoidance map module 122 may use one or more avoidance parameters 402 during operation. The parameters 402 may include thresholds 404 and corresponding values 406. In one implementation, the values 406 of the thresholds 404 may be determined using the following equations:

$$T\text{open} = (\text{AMD Diameter}) + (2*(\text{User Diameter})) \quad \text{(Equation 1)}$$

$$T\text{closed} = (\text{AMD Diameter}) + (\text{User Diameter}) \quad \text{(Equation 2)}$$

During operation, the avoidance map module 122 may use constraint data 408 that is specified with respect to the avoidance parameters 402. The constraint data 408 may comprise region type 410, region range 412, description 414, and region radius 416.

In this illustration, the region type 410 comprises an identifier indicative of the particular region, such as first region 140, second region 142, or third region 144. The region range 412 specifies a range of MAT values, or other values, used to characterize the smoothed map. The description 414 describes the nature of the constraint. The region radius 416 specifies a dimension associate with determining the side of the constraint region when determining the avoidance map 124. For example, the region radius 416 may specify the radius of a circle that is centered at a particular point in the avoidance map 124 that is "painted" or designates an associated region of the region type 410.

In the implementation depicted in FIG. 4, the region ranges 412 are specified by the following equations. In these equations "(x,y)" indicates the coordinates with respect to the avoidance map 124 and "MAT" indicates a medial axis transform function. For example "MAT(x,y)" indicates the medial axis transform value that is associated with a point in the avoidance map 124 having coordinates (x,y). The MAT algorithm is described in more detail below. In other implementations, other distance transforms may be used.

$$\text{MAT}(x,y) \geq T\text{open} \quad \text{(Equation 3)}$$

$$T\text{closed} < \text{MAT}(x,y) < T\text{open} \quad \text{(Equation 4)}$$

$$\text{MAT}(x,y) \leq T\text{closed} \quad \text{(Equation 5)}$$

For the first region type 410(1) corresponding to the first region 140 that is open, no constraints are imposed, so the corresponding region radius 416(1) is zero.

For the second region type 410(2) corresponding to the second region 142 that is narrow, constraints are imposed. The corresponding region radius 416(2) for the second region 142 associated with the point (x,y) may be determined using equation 6:

$$(T\text{open}/2) - \text{MAT}(x,y) \quad \text{(Equation 6)}$$

For the third region type 410(3) corresponding to the third region 144 that is closed, constraints are also imposed. The corresponding region radius 416(3) for the third region 144 associated with the point (x,y) may be determined using equation 7:

$$\text{MAT}(x,y) \quad \text{(Equation 7)}$$

In other implementations, one or more of different occupancy maps 120, avoidance parameters 402, or constraint data 408 may be used. For example, the avoidance map 124 may be determined based on a user diameter 132 that is specific to a particular user 130 that was identified and determined as being present in the physical space 102. As described above, the avoidance map 124 may be determined using an obstacle map 120 that is representative of obstacles with different heights. For example, the first obstacle map 120(1) representative of low obstacles and the second user diameter 132(2) associated with the lower body of the user 130 may be used to determine a first avoidance map 124(1).

In another example, the second obstacle map 120(2) and the first user diameter 132(1) associated with the upper body of the user 130 may be used to determine a second avoidance map 124(2).

In other implementations, the avoidance map 124 may be determined based on a physical configuration of the AMD 104. For example, if the AMD 104 is carrying a box, the AMD diameter 136 may be increased to account for the box. Continuing the example, once the AMD 104 is no longer carrying the box, the AMD diameter 136 may be subsequently decreased.

Figure 4B:
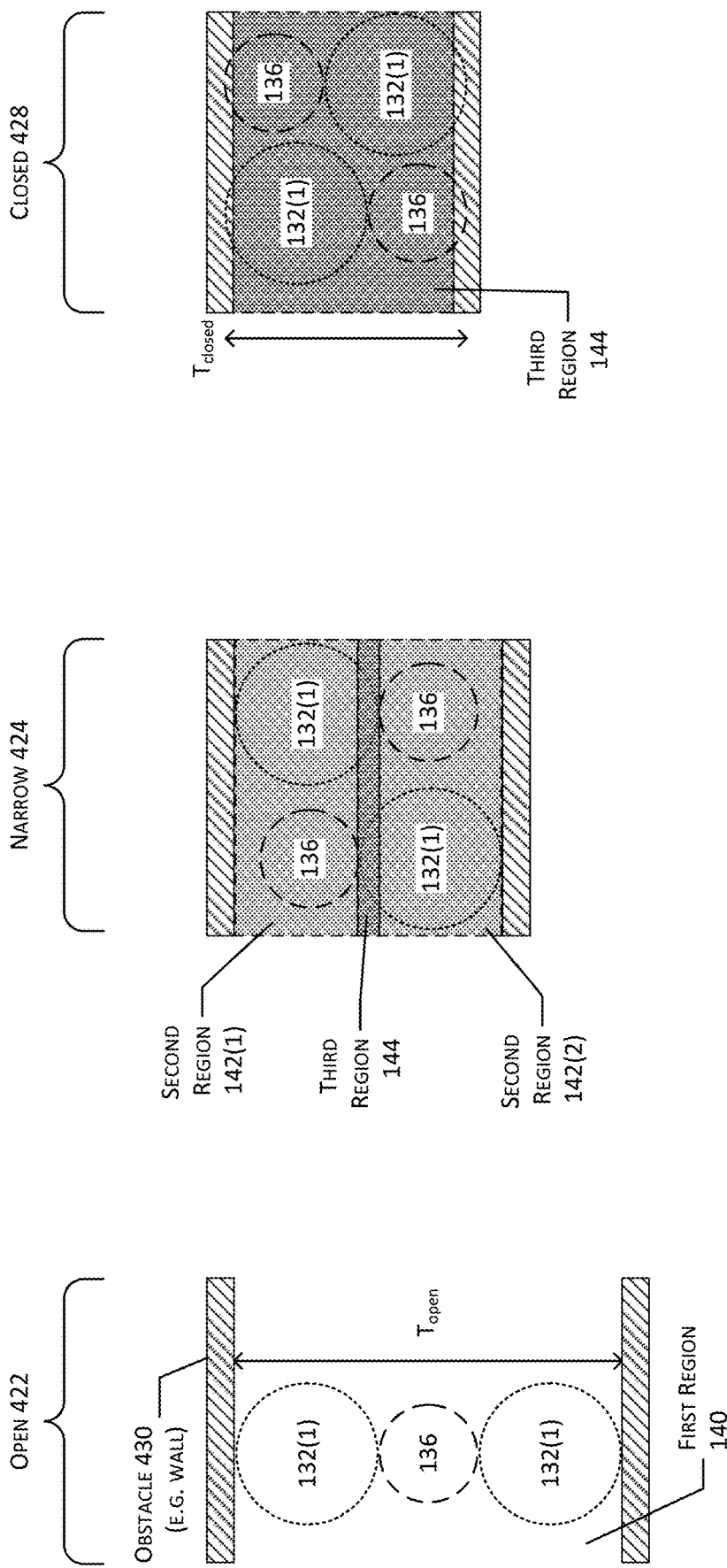
FIG. 4B illustrates thresholds associated with the constraint regions in several configurations, according to some implementations.

FIG. 4B illustrates at 420 thresholds associated with the constraint regions in several configurations, according to some implementations. An open configuration 422 is shown corresponding to Topen as calculated using Equation 1 between two obstacles 430, such as walls. In this configuration, the user 130 may easily pass the AMD 104, and vice versa. The portion of the avoidance map 124 corresponding to this open configuration 422 is represented as a first region 140.

A narrow configuration 424 is also shown. In this implementation, a third region 142 extends along a centerline of the space between the two obstacles 430. In this configuration, a boundary of the third region 144 is calculated as the user diameter 132(1) from an opposite wall. For example, the following equation may be used to determine the boundary of the third region 144:

Boundary Edge=(User Diameter relative to opposite obstacle)      (Equation 8)

The remainder of the area within the narrow configuration 424 is designated as a second region 142. For example, an area on a first side of the third region 144 is designated as a second region 142(1) and on a second side of the third region 144 is designated as a second region 142(2). In some implementations, a gradient operation may be performed with respect to regions that overlap or are adjacent to one another in determining the avoidance map 124.

As described above, the AMD 104 is precluded from stopping within the third region 144. The AMD 104 may stop within the second regions 142(1) or 142(2) but would not typically stop here. However, in the event the AMD 104 was directed to stop in the narrow configuration 424, the AMD 104 would preferentially stop within the second region 142 and not the third region 144.

The avoidance map 124 may be used by the autonomous navigation module 154 to determine a route for the AMD 104 to travel. For example, the route may attribute a first cost value to areas within the first regions 140, a second cost value to areas within the second regions 142, and a third cost value to areas within the third regions 144. The second cost value is greater than the first cost value, and the third cost value is greater than the second cost value. During route planning, the autonomous navigation module 154 may attempt to minimize a sum of the cost values associated with the regions traversed by a particular route. Continuing the example, this would result in a route that avoids the third region 144, due to the higher cost values, and preferentially moves the AMD 104 within one of the second regions 142.

Figure 5:
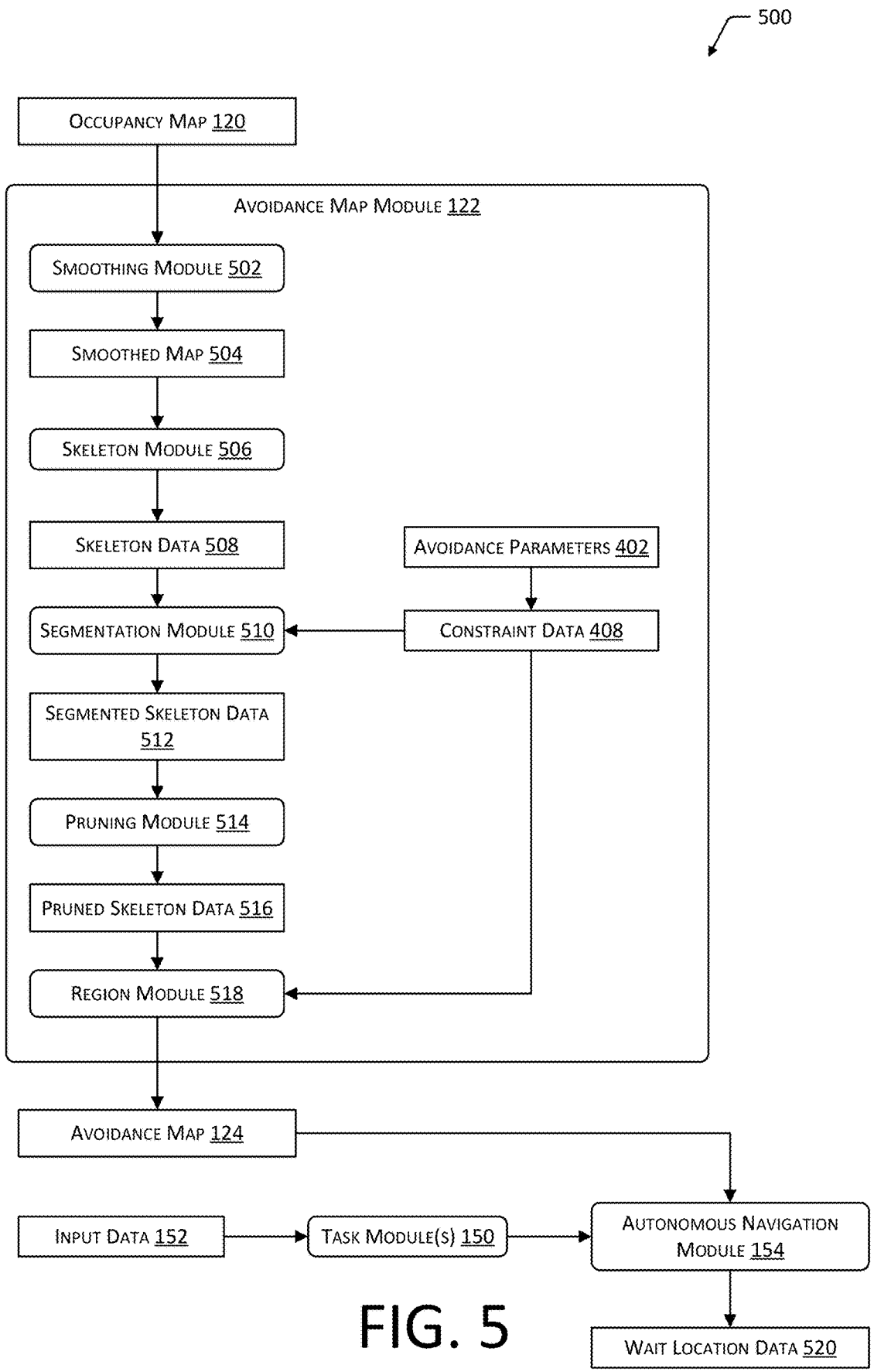
FIG. 5 is a block diagram of an avoidance map module that generates an avoidance map indicative of constraint regions, according to some implementations.

FIG. 5 is a block diagram 500 of the avoidance map module 122 that generates an avoidance map 124 indicative of constraint regions, according to some implementations.

The avoidance map module 122 may accept as input an occupancy map 120. The occupancy map 120 may be indicative of placement of one or more obstacles that impede movement in the physical space 102. In one implementation the occupancy map 120 comprises a plurality of cells with each cell of the plurality of cells representing a particular area in the physical space 102 and having an obstacle cost value that is indicative of whether the cell is able to be traversed by the AMD 104. For example, the occupancy map 120 may be indicative of a first area and a second area in the physical space 102. The first area has a first obstacle cost value that is indicative of whether the first area contains an obstacle and the second area has a second obstacle cost value that is indicative of whether the second area contains an obstacle. The mapping module 118 may generate the occupancy map 120.

As described in this disclosure, the avoidance map module 122 may operate on data using techniques and algorithms associated with image processing. For example, the occupancy map 120 as processed by the avoidance map module 122 may comprise a representation of the physical space 102 in the form of a bitmap image. Continuing the example, the coordinates of a pixel within the image, such as (x,y) coordinates, may be associated with a particular area in the physical space 102. A grayscale or color value associated with the pixel is indicative of the region type 410 associated with that pixel.

Figure 6A:
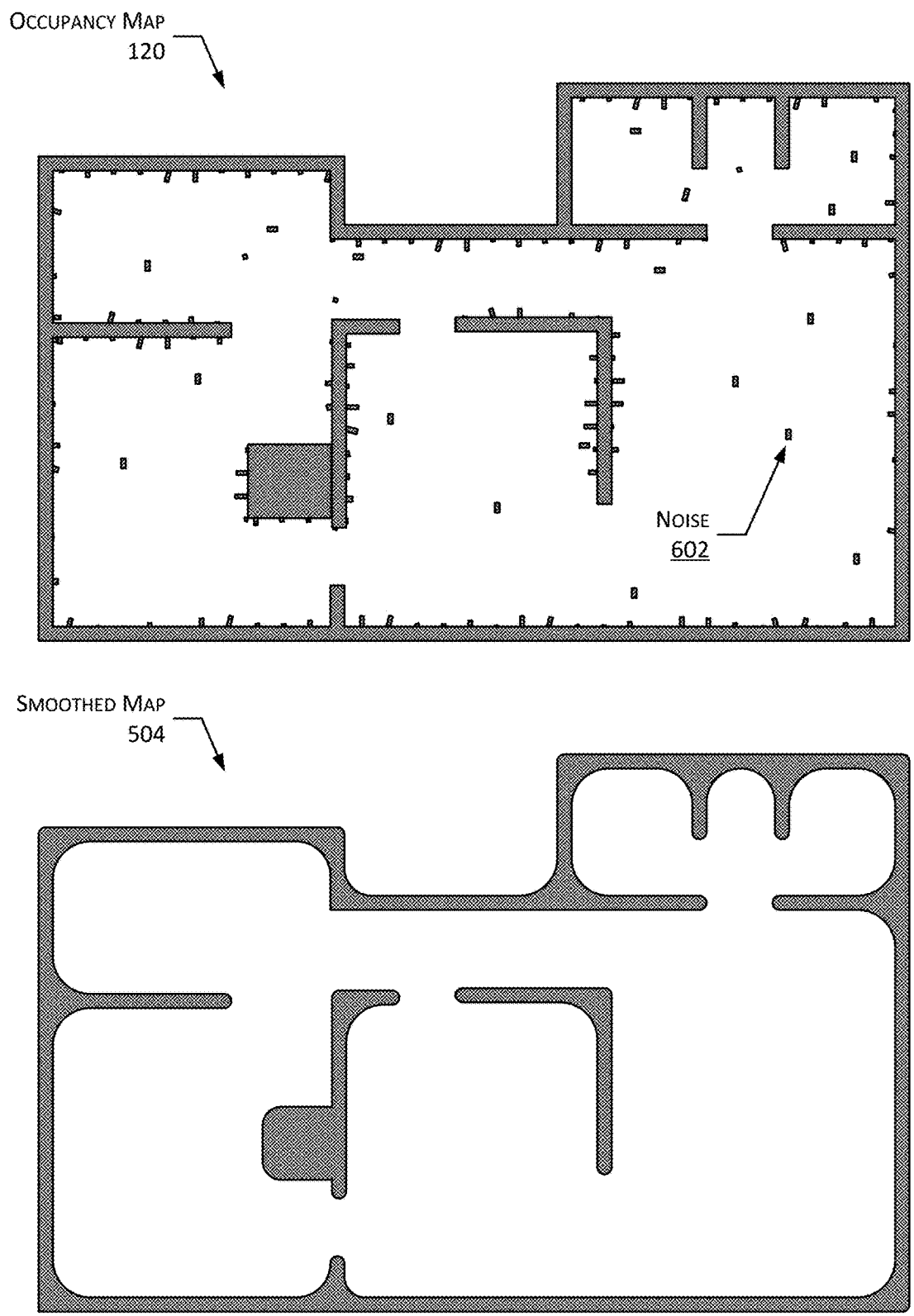
FIGS. 6A, 6B, and 6C illustrate an occupancy map, a smoothed map, a skeleton, a pruned skeleton, and an avoidance map, according to some implementations.

In some implementations, a smoothing module 502 accepts the occupancy map 120 as input and generates a smoothed map 504. The occupancy map 120 may be generated based on sensor data 228 from various sensors 114. This sensor data 228 may be noisy. For example, distance data of a surface such as a wall that is obtained using stereovision may have some variation, indicating different portions of the wall are at different distances, when the wall is actually flat. In another example, data processing techniques, such as SLAM used to generate the occupancy map 120 may introduce noise or errors into the occupancy map 120. As a result, the occupancy map 120 may indicate obstacles where there are none, free spaces where an obstacle actually is, walls may be not be flat, and so forth. This noise may be manifested by incorrect placement of obstacles, obstacles appearing in space where there are none, and so forth. An example of the noise present in an occupancy map 120 is depicted in FIG. 6A.

The smoothing module 502 may use one or more techniques to generate the smoothed map 504. In one implementation, a morphological closing algorithm may be applied to the occupancy map 120. The morphological closing algorithm has the effect of "despeckling" the data, removing noise that appears as relatively small obstacles in the occupancy map 120. Morphological closing may comprise processing data with a dilation algorithm followed by an erosion algorithm. For example, the dilation algorithm may compare pixels within a kernel describing a window of pixels and if at least one pixel in the kernel is "1", the value the pixel being processed is set to "1". This has the visual effect of slightly enlarging the size of the obstacle. This removes some of the noise that may appear as "speckles" in the occupancy map 120. The erosion algorithm operates in an opposite fashion, in that a pixel value is only set to "1" if all the pixels under the kernel are "1". This has the visual effect of slightly reducing the size of the obstacle. This also helps reduce noise by closing small holes or noise that may appear inside an obstacle. In one implementation, the smoothing module may implement the "cv2.morphologyEx" function as promulgated at opencv.org.

The smoothing module 502 may also apply a Gaussian blur to the output from the morphological closing algorithm. For example, the "cv2.Gaussian Blur" function may be used. In other implementations, other blurring functions may be used. The now blurred output may be thresholded using a thresholding algorithm to produce a binary image. For example, if the blurred image comprises possible pixel values of "0" to "255", the pixels in the blurred image may be compared to a threshold value of "128". This thresholding restores a sharp edge to the features and produces the smoothed map 504 that is a binary representation of the obstacles. The smoothed map 504 may have less detail than the occupancy map 120 and exhibit smoother curves at edges of obstacles. The size of the kernel may be selected to avoid producing output in which detail about the passages in the physical space 102 is lost. In other implementations, other algorithms may be used to determine the smoothed map 504.

In one implementation, the smoothing module 502 may be omitted and a skeleton module 506 may use the occupancy map 120 as input. In the implementation depicted in FIG. 5, the skeleton module 506 uses the smoothed map 504 as input to generate skeleton data 508. The skeleton data 508 comprises a plurality of points. One or more of the points may be associated with a skeleton value that is based at least in part on information indicative of a distance between the point and one or more obstacles in the physical space 102.

In one implementation, the skeleton module 506 may implement a medial axis transform algorithm, such as the "skimage.morphology" function as promulgated by scikit-image.org may be used. In other implementations, other skeletonization algorithms may be used.

The medial axis transform (MAT) algorithm processes input data and produces skeleton data 508 indicative of a "skeleton" comprising points. The individual points of the skeleton may be described as the loci of centers of bi-tangent circles that fit entirely within an area constrained by the obstacles indicated by input such as the occupancy map 120 or the smoothed map 504. For example, the MAT skeleton comprises a plurality of loci, each locus of the plurality of loci being a center of a bi-tangent circle with a radius that equals a distance to a nearest obstacle as indicated by the smoothed map 504. For example, the skeleton produced by a MAT algorithm of a rectangular hallway would be depicted as a line extending along a centerline of the rectangular hallway. The skeleton value associated with each point, such as a MAT value, may indicate the distance from that point to a nearest wall of the hallway. Various techniques may be used to determine the skeleton data 508. For example, a morphological thinning or erosion function may be used. In another example, a distance transform may be calculated. In one implementation, the "distanceTransform" function of OpenCV may be used.

A segmentation module 510 accepts the skeleton data 508 as input and produces segmented skeleton data 512. The segmented skeleton data 512 may comprise one or more points or segments with a region type 410 associated with the one or more points or segments. During operation, the segmentation module 510 may use one or more of the avoidance parameters 402 or the constraint data 408 to determine segmented skeleton data 512. The segmentation module 510 compares the values produced by the skeleton module 506 for one or more points of the skeleton data 508 with the region ranges 412 to determine a particular region type 410 that is associated with the one or more points. For example, each point may be associated with a region type 410. In another example, a set of points may be processed as a group and a region range 412 associated with that set of points. In some implementations, the set of points may be determined by comparing the values of adjacent points. For example, a skeleton value for a particular point may be compared to a moving average of the values for the points within a threshold distance of the particular point. If the value for the particular point is within a threshold value of the moving average, the particular point may be associated with a first set of points. Otherwise, the particular point may be associated with a second set of points.

The skeleton data 508 determined by the skeleton module 506 may have "spurs". A spur may comprise a portion of the skeleton that is associated with a portion of the physical area 102 that "dead-ends" into a location with no exit for the AMD 104. For example, a corner of a room may have an associated spur. A pruning module 514 accepts as input the segmented skeleton data 512 and determines pruned skeleton data 516 by removing these spurs. In one implementation, the pruning module 514 may determine and remove a spur by comparing adjacent skeleton values. For example, a first MAT value associated with a first point at an end of the skeleton may be compared to a second MAT value of a second point along the skeleton that is adjacent to the endpoint. If the first MAT value corresponding to the first point is less than the second MAT value, the first point may be pruned or removed from the pruned skeleton data 516. The process may iterate along the spur, starting at the endpoint and progressing inward, removing points in the fashion described. The iteration may cease when the MAT value of the current endpoint being tested is greater than or equal to the MAT value of the point being compared to.

In some implementations the comparison may be between a point that is at an endpoint of the skeleton and another point that is proximate to the endpoint. For example, the endpoint may be compared to a point on the skeleton that is immediately adjacent. In another example, the endpoint may be compared to a point on the skeleton that is separated by some distance or other increment.

The pruning module 514 may disregard from pruning those spurs in the segmented skeleton data 512 that are associated with an open region type 410. For example, a spur that is associated with a first region 140 may be disregarded as the open region would not affect placement of the wait location 134.

In some implementations, the pruning module 514 may be omitted and a region module 518 may use the segmented skeleton data 512 as input.

The region module 518 accepts as input the pruned skeleton data 516 and determines one or more constraint regions that are then used to generate the avoidance map 124. During operation the region module 518 may use the constraint data 408, such as the region radius 416. The region module 518 uses the points in the pruned skeleton data 516, the region type 410 associated with those points, and the region radius 416 to "paint" the constraint regions and produce the avoidance map 124. For example, a point in the pruned skeleton data 516 having a second region type 410(2) of "narrow" has a radius calculated as described above with regard to Equation 6. A circle is drawn in the avoidance map 124 that is centered at the point and has a region radius 416 as calculated. The process may iterate through at least a portion of the points described by the pruned skeleton data 516, assigning values indicative of region type 410 to areas corresponding to respective points in the pruned skeleton data 516.

The region module 518 may utilize a gradient algorithm to smooth the regions and avoid abrupt transitions from one region to another. In one implementation, a Gaussian algorithm may be used to smooth the regions. For example, the "cv2.Gaussian Blur" function may be used. The smoothing or blurring removes abrupt transitions between regions and may improve performance of the AMD 104 during operation. For example, the smoothing may result in a bias towards selection of wait locations 134 that are closer to the center of an open first region 140 and farther from the centers of second regions 142 or third regions 144. The smoothing of the regions may also result in improved selection of navigation routes.

The resulting avoidance map 124 may be visualized as an image or bitmap in which the grayscale values of individual pixels indicates the region type 410 associated with that pixel. The avoidance map 124 may be represented as a layer of data that may be overlaid with, or used in conjunction with, the occupancy map 120.

The avoidance map 124 may be used operate the AMD 104. For example, a task module 150 may receive input data 152 indicating that the AMD 104 is no longer needed. The AMD 104, determines that the task queue data 240 is empty and so the AMD 104 may be deemed idle. Based on this determination of being idle, the AMD 104 determines that it should move to a wait location 134. The wait location 134 is intended to keep the AMD 104 accessible while also being out of the way of the users 130. The task module 150 sends a command to the autonomous navigation module 154 to move to a wait location 134. The autonomous navigation module 154 may use the avoidance map 124 to determine wait location data 520 that is indicative of a wait location 134. The cost values indicated by the avoidance map 124 may be used to determine the wait location 134. For example, the autonomous navigation module 154 may determine the wait location 134 as the closest location to a current location of the AMD 104 that is within the first region 140. The wait location 134 may comprise a location that has total cost value that is below a threshold value associated with parking the AMD 104. Once the wait location data 520 is determined, the autonomous navigation module 154 may move the AMD 104 to the wait location 134. The AMD 104 may then stop at the wait location 134 and remain there until a command is received, a timer expires, or other event.

In another implementation, the avoidance map 124 may be used to select a notification to be presented to others in the physical space 102 based on the region that the AMD 104 is present within. The AMD 104 may determine a current location and present output using the output device 116 responsive to the current location being within a particular region. For example, while traversing the first region 140 a first sound may be presented at a first volume using the speaker 384 on the AMD 104. Continuing the example, while traversing the second region 142 a second sound may be presented at a second volume that is louder than the first volume. Continuing the example, while traversing the third region 144, a third sound may be presented at a third volume that is louder than the second volume. The presentation of these sounds may assist in warning the users 130, other AMDs 104, pets, and so forth that the AMD 104 is present and where the AMD 104 is if out of sight. In another example, the same sound may be played at different volume levels. In some implementations other output, such as light from one or more lights 382 may be used in addition to, or instead of, the presentation of sound.

Figure 6B:
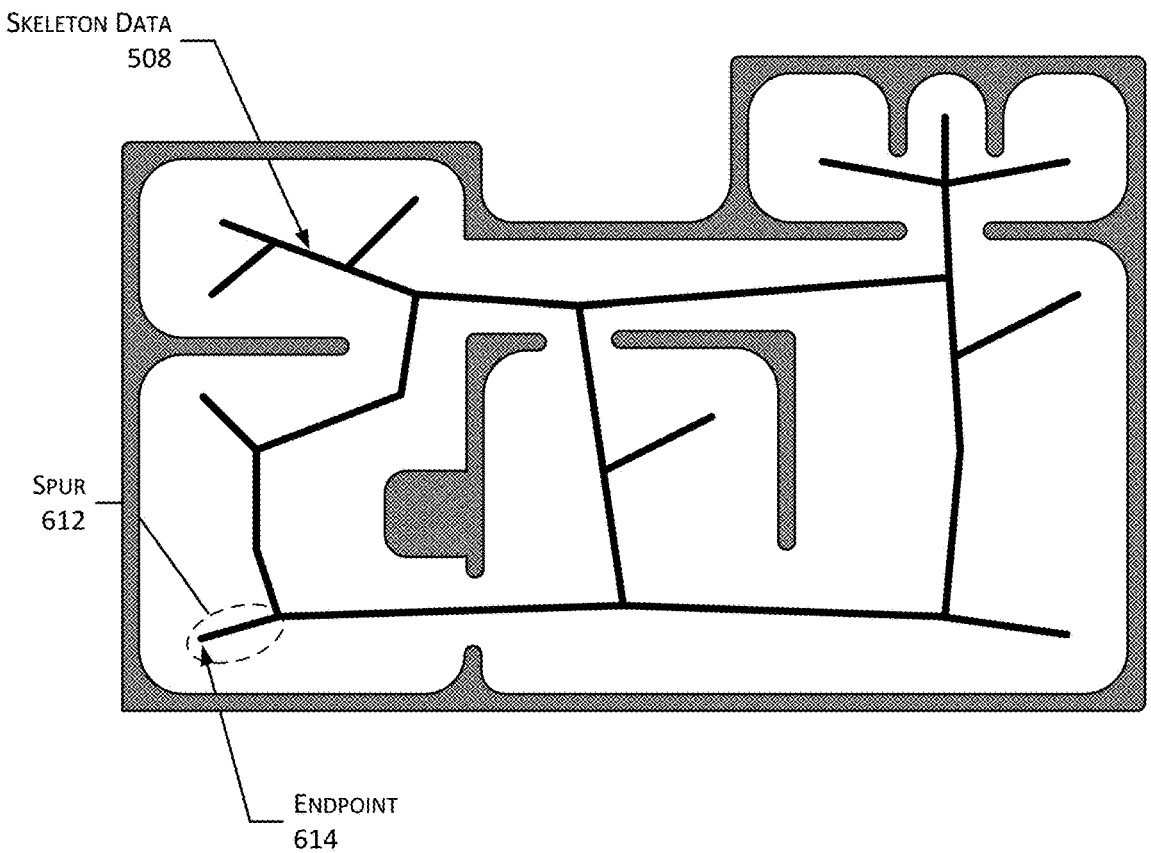
Figure 6B:
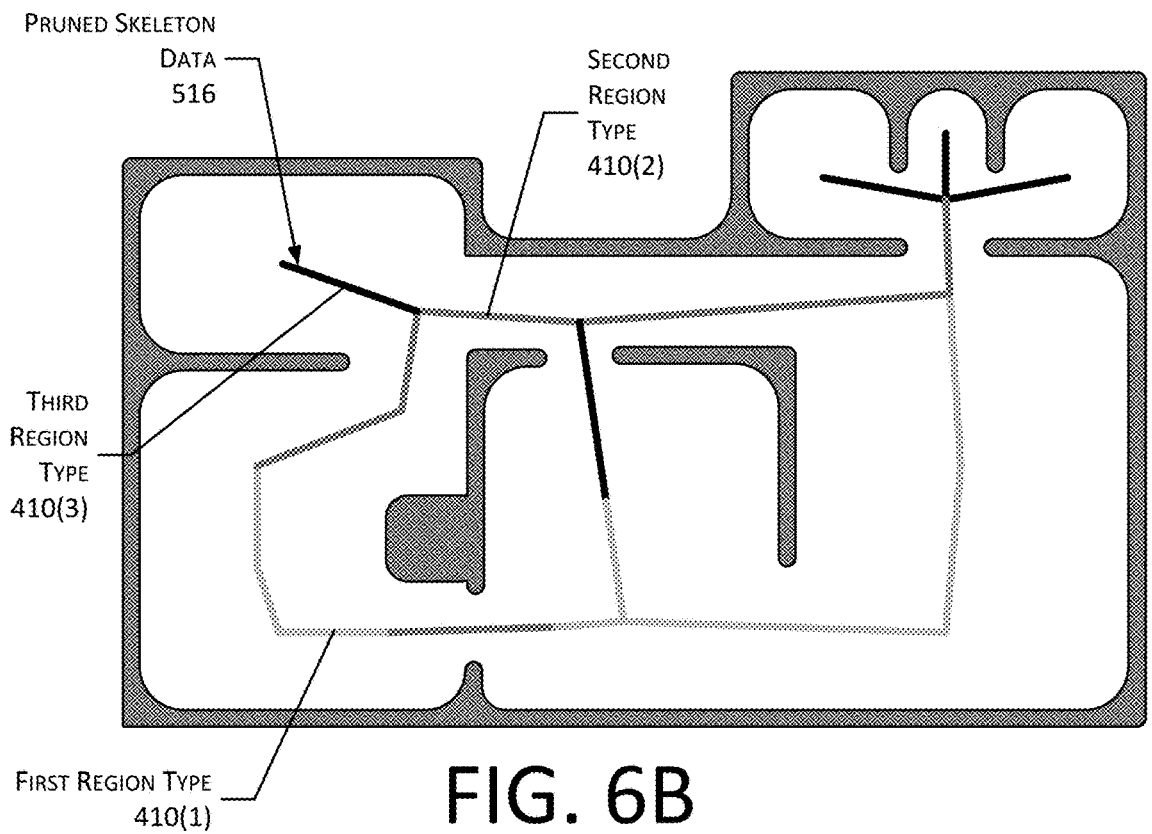
Figure 6C:
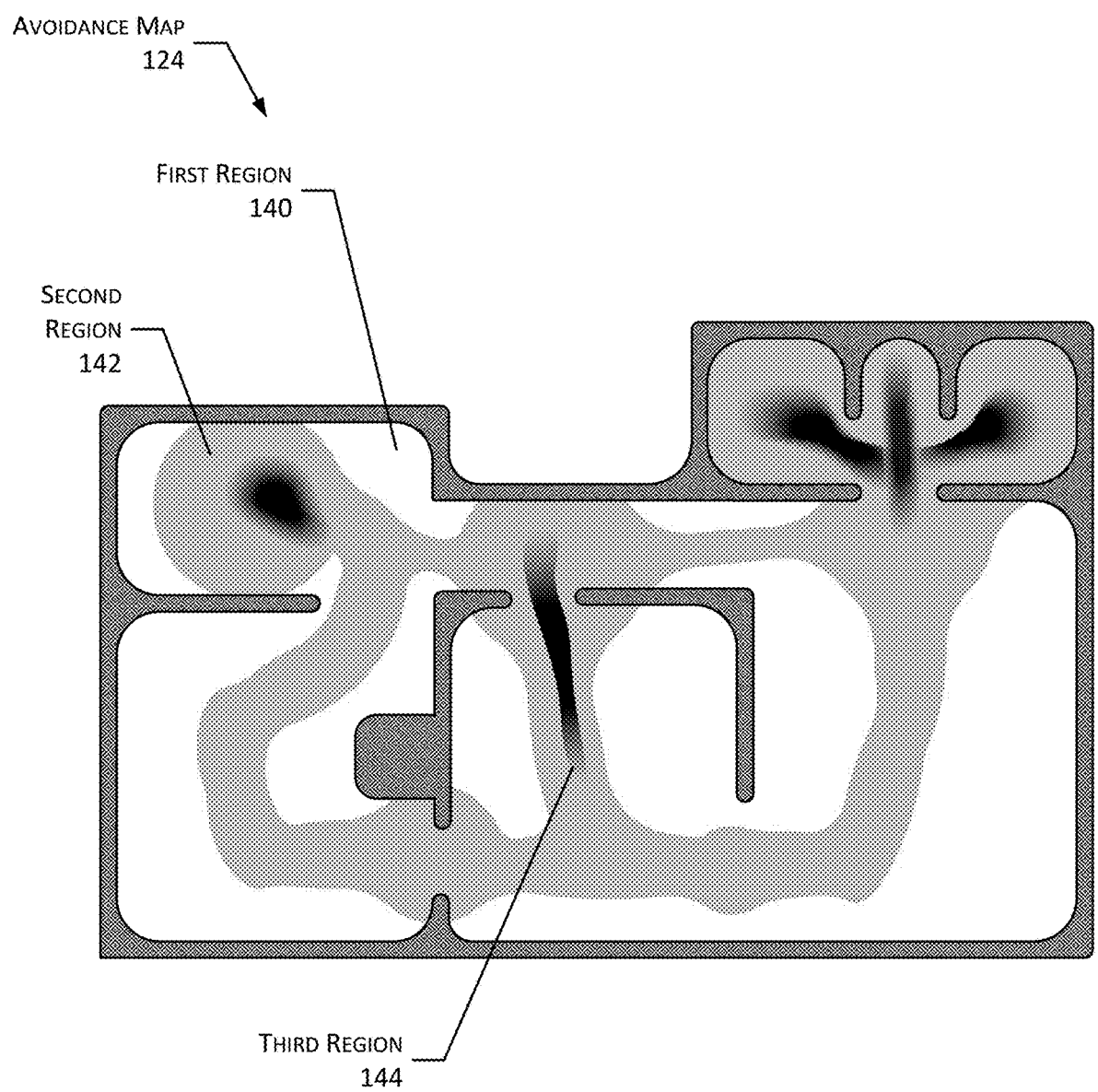

FIGS. 6A, 6B, and 6C illustrate an occupancy map 120, a smoothed map 504, skeleton data 508, pruned skeleton data 516, and an avoidance map 124, according to some implementations.

FIG. 6A depicts an occupancy map 120 of the physical space 102. The occupancy map 120 includes noise 602, such as speckles, uneven surfaces, and so forth. The noise 502 may result from operation of the sensors 114, the mapping module 118, and so forth.

FIG. 6A also shows the smoothed map 504, such as produced after the smoothing module 502 has performed a morphological closing and Gaussian blur on the occupancy map 120.

FIG. 6B shows the skeleton data 508 that is associated with the smoothed map 504. The skeleton data 508 comprises a plurality of points, and in this example includes several spurs 612. Also shown are endpoints 614 of the skeleton data 508.

FIG. 6B also shows the pruned skeleton data 516 that is associated with the smoothed map 504. The pruned skeleton data 516 includes portions that have been determined by the segmentation module 510 to be associated with particular region types 410. In this illustration, the region types 410 are denoted with different shades. A light gray line is associated with a first region type 410(1) that is open, a medium gray line is associated with a second region type 410(2) that is narrow, and a black line is associated with a third region type 410(3) that is closed.

FIG. 6C depicts the avoidance map 124 that is based on the pruned skeleton data 516 depicted in FIG. 6B. The points along the skeleton have been iterated or "walked", with the corresponding regions determined by the value of the point, such as a MAT value, and the constraint data 408. In one implementation, the avoidance map 124 may be expressed as a cost map 250 of cells, with each cell associated with a different portion of the physical space 102 and having a cost value. The cost value indicates the region type 410 that is associated with that cell. During operation, the AMD 104 may use the avoidance map 124 to determine a cost associated with a wait location 134, a planned route, speed limits for movement, and so forth.

The processes discussed in this disclosure may be implemented in hardware, software, or a combination thereof. In the context of software, the described operations represent computer-executable instructions stored on one or more computer-readable storage media that, when executed by one or more hardware processors, perform the recited operations. Generally, computer-executable instructions include routines, programs, objects, components, data structures, and the like that perform particular functions or implement particular abstract data types. Those having ordinary skill in the art will readily recognize that certain steps or operations illustrated in the figures above may be eliminated, combined, or performed in an alternate order. Any steps or operations may be performed serially or in parallel. Furthermore, the order in which the operations are described is not intended to be construed as a limitation.

Embodiments may be provided as a software program or computer program product including a non-transitory computer-readable storage medium having stored thereon instructions (in compressed or uncompressed form) that may be used to program a computer (or other electronic device) to perform the processes or methods described herein. The computer-readable storage medium may be one or more of an electronic storage medium, a magnetic storage medium, an optical storage medium, a quantum storage medium, and so forth. For example, the computer-readable storage media may include, but is not limited to, hard drives, optical disks, read-only memories (ROMs), random access memories (RAMs), erasable programmable ROMs (EPROMs), electrically erasable programmable ROMs (EEPROMs), flash memory, magnetic or optical cards, solid-state memory devices, or other types of physical media suitable for storing electronic instructions. Further embodiments may also be provided as a computer program product including a transitory machine-readable signal (in compressed or uncompressed form). Examples of transitory machine-readable signals, whether modulated using a carrier or unmodulated, include, but are not limited to, signals that a computer system or machine hosting or running a computer program can be configured to access, including signals transferred by one or more networks. For example, the transitory machine-readable signal may comprise transmission of software by the Internet.

Separate instances of these programs can be executed on or distributed across any number of separate computer systems. Thus, although certain steps have been described as being performed by certain devices, software programs, processes, or entities, this need not be the case, and a variety of alternative implementations will be understood by those having ordinary skill in the art.

Additionally, those having ordinary skill in the art will readily recognize that the techniques described above can be utilized in a variety of devices, physical spaces, and situations. Although the subject matter has been described in language specific to structural features or methodological acts, it is to be understood that the subject matter defined in the appended claims is not necessarily limited to the specific features or acts described. Rather, the specific features and acts are disclosed as illustrative forms of implementing the claims.

What is claimed is:

1. A method comprising:
    determining first data indicative of obstacles within a physical space;
    determining second data by applying a smoothing algorithm to the first data;
    determining, based on the second data, third data representing a skeleton associated with the physical space;
    determining fourth data that associates a region type with a portion of the skeleton;
    determining fifth data by pruning at least a first portion of the skeleton represented by the fourth data;
    determining sixth data indicative of one or more regions, wherein the one or more regions are based on the region type associated with a second portion of the skeleton;
    determining, based on the sixth data, a first location in a first region; and
    moving an autonomous mobile device (AMD) to the first location.

2. The method of claim 1, the smoothing algorithm comprising:
    performing a morphological closing operation on the first data to generate seventh data; and
    applying a Gaussian blur function to the seventh data to generate the second data.

3. The method of claim 1, wherein the determining the third data comprises:
    determining, using the second data and a medial axis transform algorithm, a plurality of points, each point of the plurality of points being associated with a location in the physical space and having a medial axis transform (MAT) value that is representative of a distance from the location to an obstacle in the physical space.

4. The method of claim 1, the third data comprising a plurality of points, wherein each point:
    is associated with a location in the physical space; and
    is associated with a value that is based at least in part on a distance between the location and an obstacle; and
    the determining the fourth data comprising, for at least one of the plurality of points:
        associating a point with a first region type if the value of the point is greater than or equal to a first threshold value; and
        associating the point with a second region type if the value of the point is less than a second threshold value.

5. The method of claim 4, wherein the first threshold value and the second threshold value are based at least in part on:
    a first width associated with the AMD, and
    a second width associated with a user.

6. The method of claim 1, the skeleton comprising a plurality of points, wherein each point:
    is associated with a location in the physical space; and
    is associated with a value that is based at least in part on a distance between the location and an obstacle; and
    the pruning comprising:
        determining a first point of the plurality of points that is at a distal end of the skeleton, wherein the first point is associated with a first medial axis transform (MAT) value;
        determining a second point of the plurality of points that is adjacent to the first point and proximate to a center of the skeleton, wherein the second point is associated with a second MAT value; and
        based on the first MAT value being less than the second MAT value, omitting the first point from the fifth data.

7. The method of claim 1, the skeleton comprising a plurality of points, wherein each point:
    is associated with a location in the physical space; and
    is associated with a value that is based at least in part on a distance between the location and an obstacle; and
    the determining the sixth data further comprising:
        determining a point of the plurality of points;
        determining, for the point, a region type;
        determining a radius associated with the region type; and
        determining a corresponding region, the corresponding region being a circle having the radius and wherein a center of the circle is the location in the physical space associated with the point.

8. The method of claim 1, wherein the sixth data comprises:
    the first region that is indicative of a first area within the physical space that the AMD is permitted to stop within; and
    a second region that is indicative of a second area within the physical space that the AMD is precluded from stopping within.

9. An autonomous mobile device (AMD) comprising:
    one or more memories storing first computer-executable instructions; and
    one or more processors to execute the first computer-executable instructions to:
        determine first data indicative of obstacles within a physical space;
        determine second data by applying a smoothing algorithm to the first data;
        determine, based on the second data, third data representing a skeleton associated with the physical space;
        determine fourth data that associates a region type with a portion of the skeleton;
        determine fifth data by pruning at least a first portion of the skeleton represented by the fourth data;

determine sixth data indicative of one or more regions, wherein the one or more regions are based on the region type associated with a second portion of the skeleton;
determine, based on the sixth data, a location in a region; and
move the AMD to the location.

10. The AMD of claim 9, the one or more processors to further execute the first computer-executable instructions to:
calculate, using a medial axis transform algorithm and the second data, a first medial axis transform (MAT) value associated with a first location in the physical space;
determine, based on the first MAT value, a first region that is associated with the first location;
determine, based on a comparison of the first MAT value and at least a first threshold value, a first region type associated with the first location; and
determine a first distance associated with the first region type;
wherein at least one dimension of the first region is based at least in part on the first distance.

11. The AMD of claim 10, wherein the first threshold value comprises a sum of:
a first width associated with the AMD, and
a second width associated with a user.

12. The AMD of claim 10, the one or more processors to further execute the first computer-executable instructions to:
calculate, using the medial axis transform algorithm and the second data, a second MAT value associated with a second location in the physical space, wherein the second location is distal to the first location along the skeleton representing the physical space that is generated by the medial axis transform algorithm;
determine the second MAT value is less than the first MAT value; and
remove the second location from the skeleton.

13. The AMD of claim 9, further comprising:
one or more output devices; and
the one or more processors to further execute the first computer-executable instructions to:
determine a current location of the AMD is within a first region; and
present, using the one or more output devices, output responsive to the AMD being within the first region.

14. The AMD of claim 9, the skeleton comprising a plurality of points, wherein each point:
is associated with a corresponding location in the physical space; and
is associated with a value that is based at least in part on a distance between the corresponding location and an obstacle; and
the pruning comprising:
determine a first point of the plurality of points that is at a distal end of the skeleton, wherein the first point is associated with a first medial axis transform (MAT) value;
determine a second point of the plurality of points that is adjacent to the first point and proximate to a center of the skeleton, wherein the second point is associated with a second MAT value; and
based on the first MAT value being less than the second MAT value, omit the first point from the fifth data.

15. The AMD of claim 9, the one or more processors to further execute the first computer-executable instructions to:
perform a morphological closing operation on the first data to generate seventh data; and
apply a Gaussian blur function to the seventh data to generate the sixth data.

16. The AMD of claim 9, wherein the determination of the third data comprises:
determine, using the second data and a medial axis transform algorithm, a plurality of points, each point of the plurality of points being associated with a corresponding location in the physical space and having a medial axis transform (MAT) value that is representative of a distance from the corresponding location to an obstacle in the physical space.

17. The AMD of claim 9, the skeleton comprising a plurality of points, wherein each point:
is associated with a corresponding location in the physical space; and
is associated with a value that is based at least in part on a distance between the corresponding location and an obstacle; and
the determination of the sixth data further comprising:
determine a point of the plurality of points;
determine, for the point, a region type;
determine a radius associated with the region type; and
determine a first region, the first region being a circle having the radius and wherein a center of the circle is the location in the physical space associated with the point.

18. The AMD of claim 9, wherein the sixth data comprises:
a first region that is indicative of a first area within the physical space that the AMD is permitted to stop within; and
a second region that is indicative of a second area within the physical space that the AMD is precluded from stopping within.

19. The AMD of claim 9, the one or more processors to further execute the first computer-executable instructions to:
determine a particular location in the physical space;
determine a route from a current location of the AMD to the particular location, wherein the route comprises the first portion and the second portion;
determine the first portion is within a first region;
determine the second portion is within a second region;
move the AMD at a first speed along the first portion; and
move the AMD at a second speed along the second portion, wherein the second speed is less than the first speed.

20. The AMD of claim 9, the third data comprising a plurality of points, wherein each point:
is associated with a corresponding location in the physical space; and
is associated with a value that is based at least in part on a distance between the corresponding location and an obstacle; and
the determination of the fourth data comprising, for at least one of the plurality of points:
associate a point with a first region type if the value of the point is greater than or equal to a first threshold value; and
associate the point with a second region type if the value of the point is less than a second threshold value.

* * * * *